US012333179B2

United States Patent
Lee et al.

(10) Patent No.: US 12,333,179 B2
(45) Date of Patent: Jun. 17, 2025

(54) OPERATION METHOD OF HOST CONFIGURED TO COMMUNICATE WITH STORAGE DEVICES AND MEMORY DEVICES, AND SYSTEM INCLUDING STORAGE DEVICES AND MEMORY DEVICES

(71) Applicant: SAMSUNG ELECTRONICS CO., LTD., Suwon-si (KR)

(72) Inventors: Kyunghan Lee, Suwon-si (KR); Jae-Gon Lee, Suwon-si (KR); Chon Yong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2 days.

(21) Appl. No.: 18/130,650

(22) Filed: Apr. 4, 2023

(65) Prior Publication Data
US 2023/0359389 A1    Nov. 9, 2023

(30) Foreign Application Priority Data

May 6, 2022    (KR) .......................... 10-2022-0056018

(51) Int. Cl.
*G06F 3/06*    (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0655; G06F 3/0604; G06F 3/0679
See application file for complete search history.

(56) References Cited

U.S. PATENT DOCUMENTS

| 9,436,600 B2 | 9/2016 | Lee |
| 11,086,739 B2 | 8/2021 | Robillard et al. |
| 2014/0047166 A1* | 2/2014 | Asnaashari ......... G06F 12/0246 711/103 |

(Continued)

FOREIGN PATENT DOCUMENTS

| KR | 10-0962186 B1 | 6/2010 |
| KR | 10-2018-0054394 A | 5/2018 |
| KR | 10-2021-0124082 A | 10/2021 |

OTHER PUBLICATIONS

Introducing the Compute Express Link™ 2.0 Specification, CXL, Dec. 10, 2020 (Year: 2020).*

*Primary Examiner* — Ryan Bertram
(74) *Attorney, Agent, or Firm* — Sughrue Mion, PLLC

(57) ABSTRACT

A system includes a first compute express link (CXL) storage device, a second CXL storage device, a first CXL memory device, and a CXL switch connected to the first CXL storage device, the second CXL storage device and the first CXL memory device through a CXL interface, the CXL switch configured to arbitrate communications between the first CXL storage device and the second CXL storage device, and the first CXL memory device. The first CXL memory device is configured to store first map data of the first CXL storage device and second map data of the second CXL storage device, the first CXL storage device is configured to exchange at least a portion of the first map data with the first CXL memory device through the CXL switch, and the second CXL storage device is configured to exchange at least a portion of the second map data with the first CXL memory device through the CXL switch.

18 Claims, 23 Drawing Sheets

(56) References Cited

U.S. PATENT DOCUMENTS

| | | |
|---|---|---|
| 2018/0136875 A1 | 5/2018 | Nimmagadda et al. |
| 2019/0107972 A1 | 4/2019 | Lee |
| 2020/0125503 A1 | 4/2020 | Graniello et al. |
| 2020/0226272 A1 | 7/2020 | Guim Bernat et al. |
| 2021/0049114 A1* | 2/2021 | Kim ........................ G06F 13/28 |
| 2021/0373951 A1* | 12/2021 | Malladi ............... G06F 12/0292 |
| 2021/0374056 A1 | 12/2021 | Malladi et al. |
| 2021/0390179 A1 | 12/2021 | Hahn et al. |
| 2022/0263913 A1* | 8/2022 | Zhang ................... G06F 3/0604 |
| 2022/0269433 A1* | 8/2022 | Pal ..................... G06F 13/4027 |
| 2022/0405212 A1* | 12/2022 | Kakaiya .............. G06F 12/1425 |
| 2023/0176744 A1* | 6/2023 | Hahn ................... G06F 3/0656 |
| 2023/0176775 A1* | 6/2023 | Hahn ................. G06F 13/1668 |
| | | 711/154 |
| 2023/0236742 A1* | 7/2023 | Sehgal .................. G06F 3/0679 |
| | | 711/154 |
| 2023/0297236 A1* | 9/2023 | Hinkle ................ G06F 12/0284 |
| | | 711/154 |
| 2024/0020174 A1* | 1/2024 | Han ...................... G06F 9/5044 |

* cited by examiner

OPERATION METHOD OF HOST CONFIGURED TO COMMUNICATE WITH STORAGE DEVICES AND MEMORY DEVICES, AND SYSTEM INCLUDING STORAGE DEVICES AND MEMORY DEVICES

CROSS-REFERENCE TO RELATED APPLICATIONS

This application is based on and claims priority under 35 U.S.C. § 119 to Korean Patent Application No. 10-2022-0056018, filed on May 6, 2022, in the Korean Intellectual Property Office, the disclosure of which is incorporated by reference herein in its entirety.

BACKGROUND

1. Field

One or more example embodiments of the present disclosure relates to a semiconductor memory device, and more particularly, to an operation method of a host configured to communicate with storage devices and memory devices, and a system including the storage devices and the memory devices.

2. Description of Related Art

A semiconductor memory device is classified as a volatile memory device, in which stored data disappear when a power is turned off, such as a static random access memory (SRAM) or a dynamic random access memory (DRAM), or a nonvolatile memory device, in which stored data are retained even when a power is turned off, such as a flash memory device, a phase-change RAM (PRAM), a magnetic RAM (MRAM), a resistive RAM (RRAM), or a ferroelectric RAM (FRAM).

A storage device such as a solid state drive may include a flash memory. A system of logical block addresses used in a host is different from a system of physical block addresses of the flash memory of the storage device. For this reason, the storage device may perform negotiation between a logical block address of the host and a physical block address of the flash memory by using map data in which the logical block address and the physical block address are mapped.

As the capacity of the flash memory increases, the capacity of the map data may also increase. As such, there may be required a high-capacity buffer memory to be used in the storage device, thereby causing costs for new research and development.

SUMMARY

Provided are an operation method of a host configured to communicate with storage devices and memory devices capable of managing a large amount of map data without a high-capacity buffer memory dedicated for a storage device, and a system including the storage devices and the memory devices.

Additional aspects will be set forth in part in the description which follows and, in part, will be apparent from the description, or may be learned by practice of the presented embodiments.

According to an aspect of an example embodiments, a system may include a first compute express link (CXL) storage device, a second CXL storage device, a first CXL memory device, and a CXL switch connected to the first CXL storage device, the second CXL storage device and the first CXL memory device through a CXL interface, the CXL switch configured to arbitrate communications between the first CXL storage device and the second CXL storage device, and the first CXL memory device. The first CXL memory device may be configured to store first map data of the first CXL storage device and second map data of the second CXL storage device, the first CXL storage device may be configured to exchange at least a portion of the first map data with the first CXL memory device through the CXL switch, and the second CXL storage device may be configured to exchange at least a portion of the second map data with the first CXL memory device through the CXL switch.

According to an aspect of an example embodiment, a system may include a first CXL storage device, a first CXL memory device, a second CXL memory device, and a CXL switch connected to the first CXL storage device, the first CXL memory device and the second CXL memory device through a CXL interface, the CXL switch configured to arbitrate communications between the first CXL storage device, and the first CXL memory device and the second CXL memory device. At least one of the first CXL memory device and the second CXL memory device may be configured to store first map data of the first CXL storage device, and the first CXL storage device may be configured to exchange at least a portion of the first map data with the at least one of the first CXL memory device and the second CXL memory device.

According to an aspect of an example embodiment, a method of a host configured to communicate with a plurality of CXL storage devices and a plurality of CXL memory devices may include identifying storage information of each of the plurality of CXL storage devices, identifying memory information of each of the plurality of CXL memory devices, and allocating, based on the storage information, a dedicated memory area for each of the plurality of CXL storage devices from at least two of the plurality of CXL memory devices. The plurality of CXL storage devices, the plurality of CXL memory devices, and the host may communicate through a CXL interface, and map data of each of the plurality of CXL storage devices may be stored in respective allocated dedicated memory areas.

BRIEF DESCRIPTION OF DRAWINGS

The above and other aspects, features, and advantages of certain example embodiments of the disclosure will be more apparent from the following description taken in conjunction with the accompanying drawings, in which.

DETAILED DESCRIPTION

Example embodiments of the present disclosure will be described in detail and clearly to such an extent that an ordinary one in the art easily implements the invention.

Figure 1:
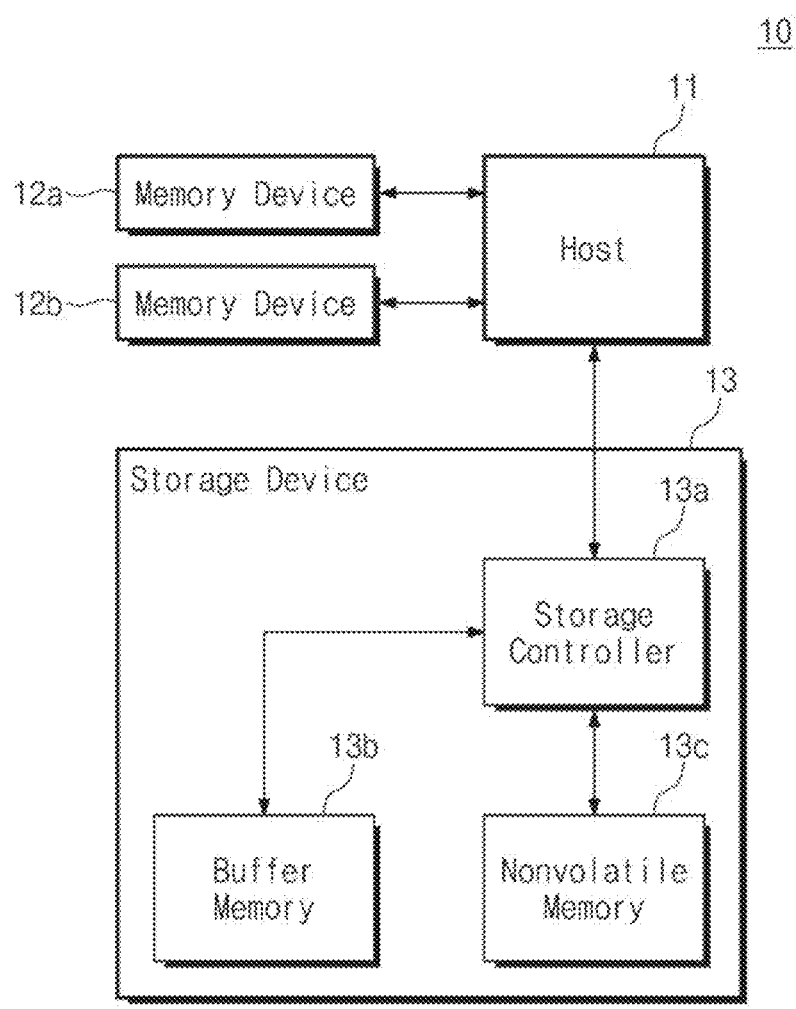
FIG. 1 is a block diagram illustrating a computing system including a storage device according to related art.

FIG. 1 is a block diagram illustrating a computing system including a storage device according to related art. Referring to FIG. 1, a computing system 10 may include a host 11, a plurality of memory devices 12a and 12b, and a storage device 13. The host 11 may control an overall operation of the computing system 10. The plurality of memory devices 12a and 12b may be used as a working memory or a system memory of the host 11.

The storage device 13 may include a storage controller 13a, a buffer memory 13b, and a nonvolatile memory 13c. Under control of the host 11, the storage controller 13a may store data in the nonvolatile memory 13c or may send data stored in the nonvolatile memory 13c to the host 11.

The buffer memory 13b may store a variety of information necessary for the storage device 13 to operate. For example, the storage controller 13a may manage data stored in the nonvolatile memory 13c by using map data. The map data may include information about relationship between a logical block address managed by the host 11 and a physical block address of the nonvolatile memory 13c.

In an example embodiment, the buffer memory 13b may be a high-speed memory such as a dynamic random access memory (DRAM). As the capacity of the nonvolatile memory 13c increases, the size of necessary map data may increase. However, because the capacity of the buffer memory 13b included in the single storage device 13 is limited, related art systems are unable to be implemented with the increase in the size of the map data due to the increase in the capacity of the nonvolatile memory 13c.

Figure 2:
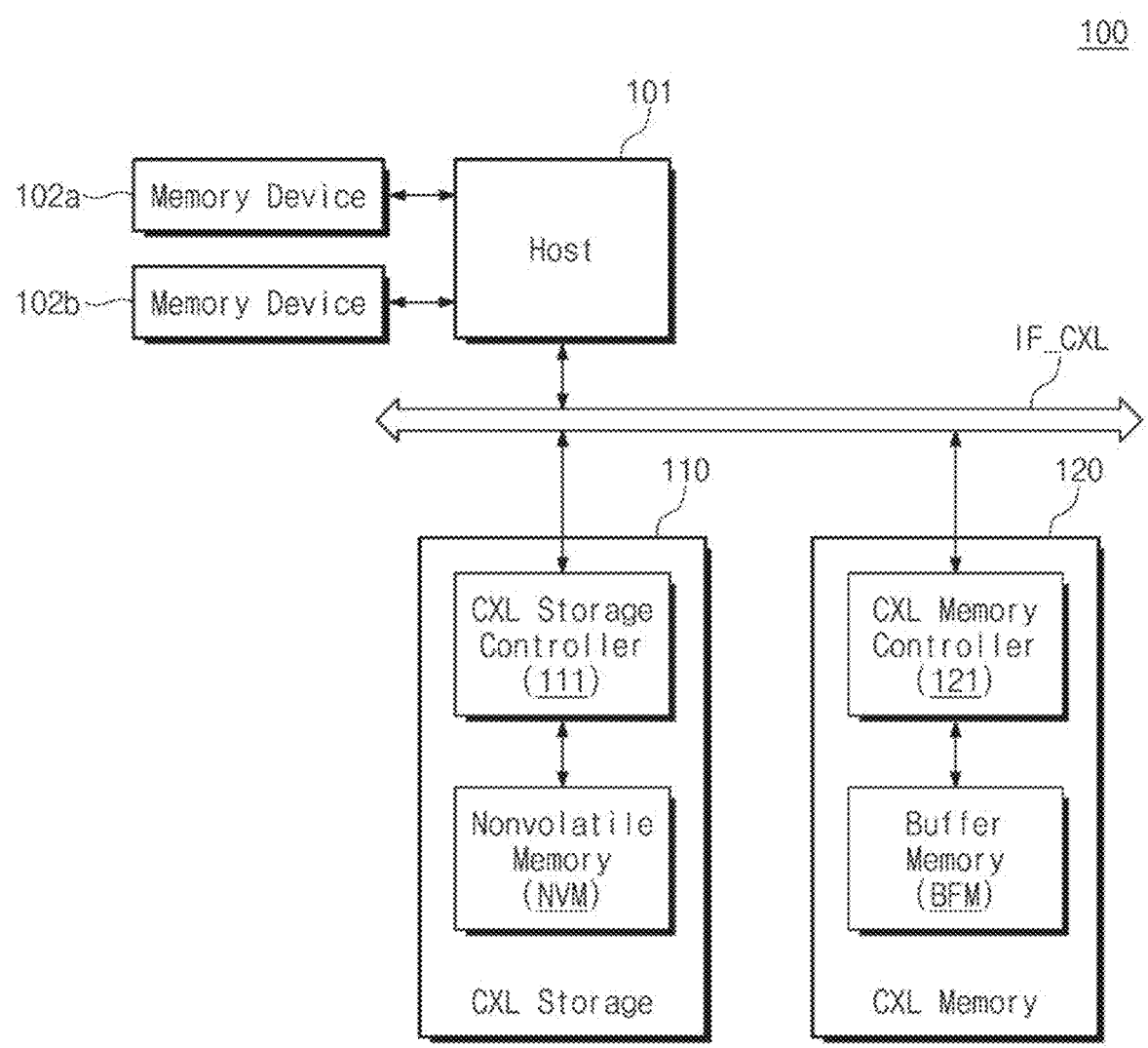
FIG. 2 is a block diagram illustrating a computing system to which a storage system is applied according to an example embodiment.

FIG. 2 is a block diagram illustrating a computing system to which a storage system is applied according to an example embodiment. Referring to FIG. 2, a computing system 100 may include a host 101, a plurality of memory devices 102a and 102b, a compute express link (CXL) storage 110, and a CXL memory 120. In an example embodiment, the computing system 100 may be included in user devices such as a personal computer (PC), a laptop computer, a server, a media player, and a digital camera or automotive devices such as a navigation system, a black box, and an automotive electronic device/part. Alternatively, the computing system 100 may be a mobile system such as a mobile phone, a smartphone, a tablet PC, a wearable device, a health care device, or an Internet of things (IoT) device.

The host 101 may control an overall operation of the computing system 100. In an example embodiment, the host 101 may be one of various processors such as a central processing unit (CPU), a graphics processing unit (GPU), a neural processing unit (NPU), and a data processing unit (DPU). In an example embodiment, the host 101 may include a single core processor or a multi-core processor.

The plurality of memory devices 102a and 102b may be used as a main memory or a system memory of the computing system 100. In an example embodiment, each of the plurality of memory devices 102a and 102b may be a DRAM device and may have the form factor of the dual in-line memory module (DIMM). However, the present disclosure is not limited thereto. For example, the plurality of memory devices 102a and 102b may include a nonvolatile memory such as a flash memory, a phase change RAM (PRAM), a resistive RAM (RRAM), or a magnetic RAM (MRAM).

The plurality of memory devices 102a and 102b may directly communicate with the host 101 through the double data rate (DDR) interface. In an example embodiment, the host 101 may include a memory controller configured to control the plurality of memory devices 102a and 102b. However, the present disclosure is not limited thereto. For example, the plurality of memory devices 102a and 102b may communicate with the host 101 through various interfaces.

The CXL storage 110 may include a CXL storage controller 111 and a nonvolatile memory NVM. Under control of the host 101, the CXL storage controller 111 may store data in the nonvolatile memory NVM or may send data stored in the nonvolatile memory NVM to the host 101. In an example embodiment, the nonvolatile memory NVM may be a NAND flash memory, but the present disclosure is not limited thereto.

The CXL memory 120 may include a CXL memory controller 121 and a buffer memory BFM. Under control of the host 101, the CXL memory controller 121 may store data in the buffer memory BFM or may send data stored in the buffer memory BFM to the host 101. In an example embodiment, the buffer memory BFM may be a DRAM, but the present disclosure is not limited thereto.

In an example embodiment, the host 101, the CXL storage 110, and the CXL memory 120 may be configured to share the same interface. For example, the host 101, the CXL storage 110, and the CXL memory 120 may communicate with each other through a CXL interface IF_CXL. In an example embodiment, the CXL interface IF_CXL may indicate a low-latency and high-bandwidth link that supports coherency, memory access, and dynamic protocol muxing of input/output (IO) protocols such that various connections between accelerators, memory devices, or various electronic devices are possible.

In an example embodiment, unlike the storage device 13 of FIG. 1, the CXL storage 110 may not include a separate buffer memory for storing or managing map data. In this case, the CXL storage 110 may require a buffer memory for storing or managing the map data. In an example embodiment, at least a partial area of the CXL memory 120 may be used as a buffer memory of the CXL storage 110. In this case, a mapping table that is managed by the CXL storage controller 111 of the CXL storage 110 may be stored in the CXL memory 120. For example, at least a partial area of the CXL memory 120 may be allocated for a buffer memory of the CXL storage 110 (i.e., for an area dedicated for the CXL storage 110) by the host 101.

In an example embodiment, the CXL storage 110 may access the CXL memory 120 through the CXL interface IF_CXL. For example, the CXL storage 110 may store the mapping table in the allocated area of the CXL memory 120 or may read the mapping table from the allocated area of the CXL memory 120. Under control of the CXL storage 110, the CXL memory 120 may store data (e.g., the map data) in the buffer memory BFM or may send the data (e.g., the map data) stored in the buffer memory BFM to the CXL storage 110.

As described with reference to FIG. 1, the related art storage device 13 stores and manages the map data by using the buffer memory 13b included therein. As the capacity of the storage device 13 increases, the size of the map data increase, thereby causing an increase in the capacity of the buffer memory 13b included in the storage device 13. However, there is a limitation on an increase in capacity due to the structure and physical characteristic of the buffer memory 13b included in the storage device 13. In this case, the design change or additional integration of the buffer memory 13b is required.

In contrast, according to example embodiments of the disclosure, the CXL storage 110 may use at least a partial area of the CXL memory 120 placed outside the CXL storage 110 as a buffer memory. In this case, because the CXL memory 120 is implemented independently of the CXL storage 110, the CXL memory 120 may be implemented with a high-capacity memory. As such, even though the size of the map data increases due to an increase in the capacity of the CXL storage 110, the map data may be normally managed by the CXL memory 120. For example, it is assumed that a storage capacity of the CXL storage 110 is 128 TB and the CXL storage uses 4 KB mapping structure. In this case, about 128 GB of DRAM is required to store and manage the map data of the CXL storage 110. It is difficult to embed a large capacity of DRAM into a storage device. However, when the DRAM for storing and managing the map data of the CXL storage 110 is placed outside the CXL storage 110, it is easy to increase a capacity of the DRAM. Thus, according to the present disclosure, the large amount of map data of the CXL storage 110 is managed by using the CXL memory 120 (or, an external memory) without a performance degradation.

In an example embodiment, the storage controller 13a of the related storage device 13 communicate with the host 11 through the host interface such as peripheral component interconnect express (PCIe) or NVM express (NVMe), and communicates with the buffer memory 13b through the memory interface such as a DDR interface or a low-power DDR (LPDDR) interface. That is, the storage controller 13a of the related art storage device 13 communicates with the host 11 and the buffer memory 13b included therein, through different interfaces (i.e., heterogeneous interfaces).

In contrast, according to an example embodiment of the present disclosure, the CXL storage controller 111 of the CXL storage 110 may communicate with the host 101 and the CXL memory 120 (i.e., a buffer memory) through the CXL interface IF_CXL. In other words, the CXL storage controller 111 of the CXL storage 110 may communicate with the host 101 and the CXL memory 120 through a homogeneous interface or a common interface and may use a partial area of the CXL memory 120 as a buffer memory.

Below, for convenience of description, it is assumed that the host 101, the CXL storage 110, and the CXL memory 120 communicate with each other through the CXL interface IF_CXL. However, the present disclosure is not limited thereto. For example, the host 101, the CXL storage 110, and the CXL memory 120 may communicate with each other based on various computing interfaces complying with the following: GEN-Z protocol, NVLink protocol, cache coherent interconnect for accelerators (CCIX) protocol, and Open coherent accelerator processor interface (CAPI) protocol.

Figure 3:
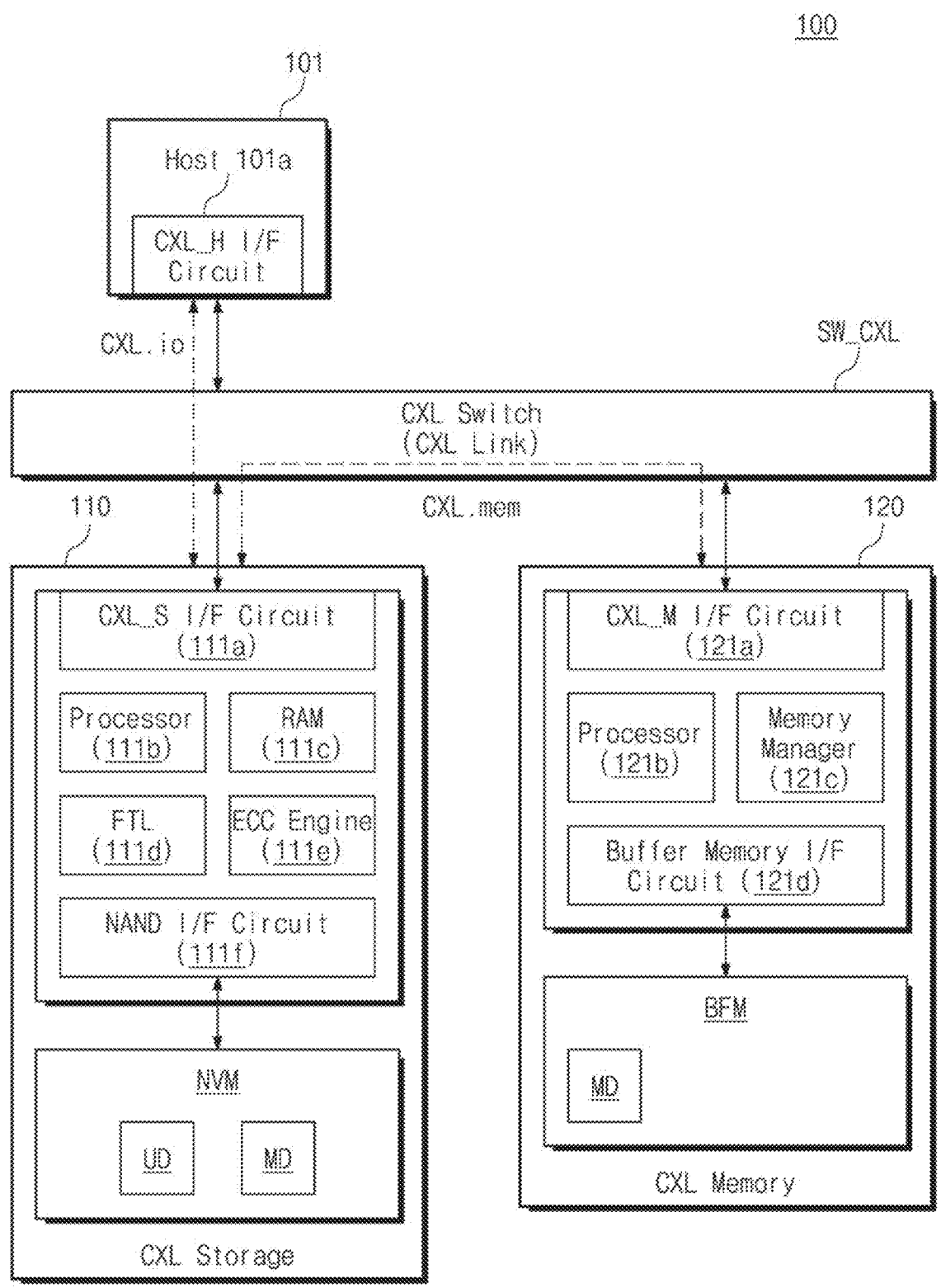
FIG. 3 is a block diagram illustrating components of a computing system of FIG. 2 according to an example embodiment.

FIG. 3 is a block diagram illustrating components of a computing system of FIG. 2 according to an example embodiment. Referring to FIGS. 2 and 3, the computing system 100 may include a CXL switch SW_CXL, the host 101, the CXL storage 110, and the CXL memory 120.

The CXL switch SW_CXL may be a component included in the CXL interface IF_CXL. The CXL switch SW_CXL may be configured to arbitrate the communication between the host 101, the CXL storage 110, and the CXL memory 120. For example, when the host 101 and the CXL storage 110 communicate with each other, the CXL switch SW_CXL may be configured to send information, which is provided from the host 101 or the CXL storage 110, such as a request, data, a response, or a signal to the CXL storage 110 or the host 101. When the host 101 and the CXL memory 120 communicate with each other, the CXL switch SW_CXL may be configured to send information, which is provided from the host 101 or the CXL memory 120, such as a request, data, a response, or a signal to the CXL memory 120 or the host 101. When the CXL storage 110 and the CXL memory 120 communicate with each other, the CXL switch SW_CXL may be configured to send information, which is provided from the CXL storage 110 or the CXL memory 120, such as a request, data, a response, or a signal to the CXL memory 120 or the CXL storage 110.

The host 101 may include a CXL host interface circuit 101a. The CXL host interface circuit 101a may communicate with the CXL storage 110 or the CXL memory 120 through the CXL switch SW_CXL.

In an example embodiment, a configuration of the CXL storage 110 may be different from configurations of conventional storages. For example, a related art storage device (e.g., a solid-state drive (SSD) including a DRAM buffer) stores and manages map data in the DRAM buffer included in the conventional storage device. In this case, a high-capacity DRAM buffer for storing the map data should be included in the related art storage device. Alternatively, another type of related art storage device (e.g., a DRAM-less SSD or a DRAM-less memory card) stores the entire map data in a nonvolatile memory (e.g., a NAND flash memory) included in the related art storage device, and loads and uses a portion of the map data onto an static RAM (SRAM) buffer. In this case, to load the map data, the access to the nonvolatile memory whose operating speed is lower than that of the DRAM buffer is frequently performed, thereby reducing the performance of operation.

In contrast, the CXL storage 110 according to the present disclosure may not include a separate DRAM buffer configured to store the map data. In this case, map data MD may be stored and managed in the CXL memory 120 placed outside the CXL storage 110. As will be described below, because the CXL memory 120 supports a fast operating speed, the CXL storage 110 may have the same performance as the related art storage device (e.g., a storage device including a DRAM). In addition, because the CXL memory 120 is placed outside the CXL storage 110, it may be easy to cope with a large amount of map data of the CXL storage 110.

The CXL storage 110 may include the CXL storage controller 111 and the nonvolatile memory NVM. The CXL storage controller 111 may include a CXL storage interface circuit 111a, a processor 111b, a RAM 111c, a flash translation layer (FTL) 111d, an error correction code (ECC) engine 111e, and a NAND interface circuit 111f.

The CXL storage interface circuit 111a may be connected with the CXL switch SW_CXL. The CXL storage interface circuit 111a may communicate with the host 101 or the CXL memory 120 through the CXL switch SW_CXL.

The processor 111b may be configured to control an overall operation of the CXL storage controller 111. The RAM 111c may be used as a working memory or a buffer memory of the CXL storage controller 111. In an example embodiment, the RAM 111c may be an SRAM and may be used as a read buffer and a write buffer for the CXL storage 110. In an example embodiment, as will be described below, the RAM 111c may be configured to temporarily store the map data MD read from the CXL memory 120 or a portion of the map data MD.

The FTL 111d may perform various management operations for efficiently using the nonvolatile memory NVM. For example, the FTL 111d may perform address translation between a logical block address managed by the host 101 and a physical block address used in the nonvolatile memory NVM, based on map data (or a mapping table). The FTL 111d may perform a bad block management operation for the nonvolatile memory NVM. The FTL 111d may perform a wear leveling operation for the nonvolatile memory NVM. The FTL 111d may perform a garbage collection operation for the nonvolatile memory NVM.

In an example embodiment, the FTL 111d may be implemented in the form of hardware, firmware, or software, or in the form of a combination thereof. In the case where the FTL 111d is implemented in the form of firmware or software, program codes associated with the FTL 111d may be stored in the RAM 111c and may be driven by the processor 111b. In the case where the FTL 111d is implemented by hardware, hardware components configured to perform the above management operations may be implemented in the CXL storage controller 111.

The ECC engine 111e may perform error detection and correction on data read from the nonvolatile memory NVM. For example, the ECC engine 111e may generate parity bits for user data UD to be stored in the nonvolatile memory NVM, and the parity bits generated may be stored in the nonvolatile memory NVM together with the user data UD. When the user data UD are read from the nonvolatile memory NVM, the ECC engine 111e may detect and correct an error of the user data UD by using the parity bits read from the nonvolatile memory NVM together with the user data UD.

The NAND interface circuit 111f may control the nonvolatile memory NVM such that data are stored in the nonvolatile memory NVM or data are read from the nonvolatile memory NVM. In an example embodiment, the NAND interface circuit 111f may be implemented to comply with the standard protocol such as a toggle interface or open NAND flash interface working group (ONFI). For example, the nonvolatile memory NVM may include a plurality of NAND flash devices. In the case where the NAND interface circuit 111f is implemented based on the toggle interface, the NAND interface circuit 111f communicates with the plurality of NAND flash devices through a plurality of channels. The plurality of NAND flash devices may be connected with the plurality of channels through a multi-channel, multi-way structure.

The NAND interface circuit 111f may send a chip enable signal/CE, a command latch enable signal CLE, an address latch enable signal ALE, a read enable signal/RE and a write enable signal/WE to the plurality of NAND flash devices through the plurality of channels. The NAND interface circuit 111f and each NAND flash device may exchange a data signal DQ and a data strobe signal DQS through each channel.

Table 1 shows operating modes of a NAND flash device according to a state of each signal.

TABLE 1

| /CE | CLE | ALE | /WE | /RE | DQS | DQx | MODE |
|---|---|---|---|---|---|---|---|
| L | H | L | ↑ | H | X | CMD | Command Input |
| L | L | H | ↑ | H | X | ADDR | Address Input |
| L | L | L | H | H | ↑↓ | DATA_in | Data Input |
| L | L | L | H | ↑↓ | ↑↓ | DATA_out | Data Output |

Referring to Table 1, while the NAND flash device receives a command CMD or an address ADDR or receives/outputs data "DATA", the chip enable signal/CE maintains a low state "L". During a command input mode, the NAND interface circuit 111f may control signal lines such that the clock latch enable signal CLE has a high level "H", the address latch enable signal ALE has the low level "L", the write enable signal/WE toggles between the high level "H" and the low level "L" and the read enable signal/RE has the high level "H". During the command input mode, the NAND interface circuit 111f may send the command CMD to the NAND flash device through data signals DQx in synchronization with the rising edge ↑ of the write enable signal/WE. The NAND flash device may identify the command CMD from the data signals DQx in response to the rising edge ↑ of the write enable signal/WE. During an address input mode, the NAND interface circuit 111f may control signal lines such that the clock latch enable signal CLE has the low level "L", the address latch enable signal ALE has the high level "H", the write enable signal/WE toggles between the high level "H" and the low level "L", and the read enable signal/RE has the high level "H". During the address input mode, the NAND interface circuit 111f may send the address ADDR to the NAND flash device through the data signals DQx in synchronization with the rising edge ↑ of the write enable signal/WE. The NAND flash device may identify the address ADDR from the data signals DQx in response to the rising edge ↑ of the write enable signal/WE. In an example embodiment, the address ADDR may be a value corresponding to a physical block address of the NAND flash device.

During a data input mode, the NAND interface circuit 111f may control signal lines such that the command latch enable signal CLE has the low level "L", the address latch enable signal ALE has the low level "L", the write enable signal/WE has the high level "H", the read enable signal/RE has the high level "H", and the data strobe signal DQS toggles between the high level "H" and the low level "L". During the data input mode, the NAND interface circuit 111*f* may send the data "DATA" to the NAND flash device through the data signals DQx in synchronization with the rising edge ↑ and the falling edge ↓ of the data strobe signal DQS. The NAND flash device may identify the data "DATA" from the data signals DQx in response to the rising edge ≡ and the falling edge ↓ of the data strobe signal DQS.

During a data output mode, the NAND interface circuit 111*f* may control signal lines that the command latch enable signal CLE has the low level "L", the address latch enable signal ALE has the low level "L", the write enable signal/WE has the high level "H", and the read enable signal/RE toggles between the high level "H" and the low level "L". During the data output mode, the NAND flash device may generate the data strobe signal DQS toggling between the high level "H" and the low level "L" in response to the read enable signal/RE. The NAND flash device may send the data "DATA" to the NAND interface circuit 111*f* through the data signals DQx in synchronization with the rising edge ↑ and the falling edge ↓ of the data strobe signal DQS. The NAND interface circuit 111*f* may identify the data "DATA" from the data signals DQx in response to the rising edge ↑ and the falling edge ↓ of the data strobe signal DQS.

The toggle interface described above is an example, and the present disclosure is not limited thereto.

The nonvolatile memory NVM may store or output the user data UD under control of the CXL storage controller 111. The nonvolatile memory NVM may store or output the map data MD under control of the CXL storage controller 111. In an example embodiment, the map data MD stored in the nonvolatile memory NVM may include mapping information corresponding to the entire user data UD stored in the nonvolatile memory NVM. The map data MD stored in the nonvolatile memory NVM may be stored in the CXL memory 120 in the initialization operation of the CXL storage 110.

The CXL memory 120 may include the CXL memory controller 121 and the buffer memory BFM. The CXL memory controller 121 may include a CXL memory interface circuit 121*a*, a processor 121*b*, a memory manager 121*c*, and a buffer memory interface circuit 121*d*.

The CXL memory interface circuit 121*a* may be connected with the CXL switch SW_CXL. The CXL memory interface circuit 121*a* may communicate with the host 101 or the CXL storage 110 through the CXL switch SW_CXL.

The processor 121*b* may be configured to control an overall operation of the CXL memory controller 121. The memory manager 121*c* may be configured to manage the buffer memory BFM. For example, the memory manager 121*c* may be configured to translate a memory address (e.g., a logical address or a virtual address) from the host 101 or the CXL storage 110 into a physical address for the buffer memory BFM. In an example embodiment, the memory address that is an address for managing a storage area of the CXL memory 120 may be a logical address or a virtual address that is designated and managed by the host 101.

The buffer memory interface circuit 121*d* may control the buffer memory BFM such that data are stored in the buffer memory BFM or data are read from the buffer memory BFM. In an example embodiment, the buffer memory interface circuit 121*d* may be implemented to comply with the standard protocol such as a DDR interface or an LPDDR interface.

Under control of the CXL memory controller 121, the buffer memory BFM may store data or may output the stored data. In an example embodiment, the buffer memory BFM may be configured to store the map data MD that are used in the CXL storage 110. The map data MD may be transferred from the CXL storage 110 to the CXL memory 120 when the computing system 100 is initialized or the CXL storage 110 is initialized.

As described above, the CXL storage 110 according to an example embodiment of the disclosure may store the map data MD, which are necessary to manage the nonvolatile memory NVM, in the CXL memory 120 connected through the CXL switch SW_CXL (or the CXL interface IF_CXL). When the CXL storage 110 performs the read operation depending on a request of the host 101, the CXL storage 110 may read at least a portion of the map data MD from the CXL memory 120 through the CXL switch SW_CXL (or the CXL interface IF_CXL) and may perform the read operation based on the map data MD read. Alternatively, when the CXL storage 110 performs the write operation depending on a request of the host 101, the CXL storage 110 may perform the write operation on the nonvolatile memory NVM and may update the map data MD. In this case, the updated map data MD may be first stored in the RAM 111*c* of the CXL storage controller 111, and the map data MD stored in the RAM 111*c* may be transferred to the buffer memory BFM of the CXL memory 120 through the CXL switch SW_CXL (or the CXL interface IF_CXL), so as to be updated in the buffer memory BFM.

In an example embodiment, at least a partial area of the buffer memory BFM of the CXL memory 120 may be allocated for a dedicated area for the CXL storage 110, and the remaining area may be used as an area that is capable of being accessed by the host 101.

In an example embodiment, the host 101 and the CXL storage 110 may communicate with each other by using CXL.io, which may refer to an input/output protocol. The CXL.io may have a PCIe-based non-coherency input/output protocol. The host 101 and the CXL storage 110 may exchange user data or variety of information with each other by using the CXL. io.

In an example embodiment, the CXL storage 110 and the CXL memory 120 may communicate with each other by using CXL.mem, which may refer to a memory access protocol. The CXL.mem may be a memory access protocol that supports memory access. The CXL storage 110 may access a partial area (e.g., an area where the map data MD are stored or a CXL storage-dedicated area) of the CXL memory 120 by using the CXL.mem.

In an example embodiment, the host 101 and the CXL memory 120 may communicate with each other by using CXL.mem. The host 101 may access the remaining area (e.g., the remaining area other than the area where the map data MD is stored or the remaining area other than the CXL storage-dedicated area) of the CXL memory 120 by using the CXL. mem.

The above access types including CXL.io and CXL.mem are provided as an example, and the present disclosure is not limited thereto.

In an example embodiment, the CXL storage 110 and the CXL memory 120 may be installed in a CXL interface-based physical port (e.g., a PCIe physical port). In an example embodiment, the CXL storage 110 and the CXL memory 120 may be implemented based on the E1.S, E1.L, E3.S, E3.L, or PCIe add-in card (AIC) (card electromechanical specification (CEM)) form factor. Alternatively, the CXL storage 110 and the CXL memory 120 may be implemented based on the U.2 form factor, the M.2 form factor, various different types of PCIe-based form factors, or various different types of small form factors. As will be described with reference to FIG. 14, the CXL storage 110 and the CXL memory 120 may be implemented with various types of form factors, and may support a function of a hot-plug capable of being installed in or removed from the physical port.

Figure 4:
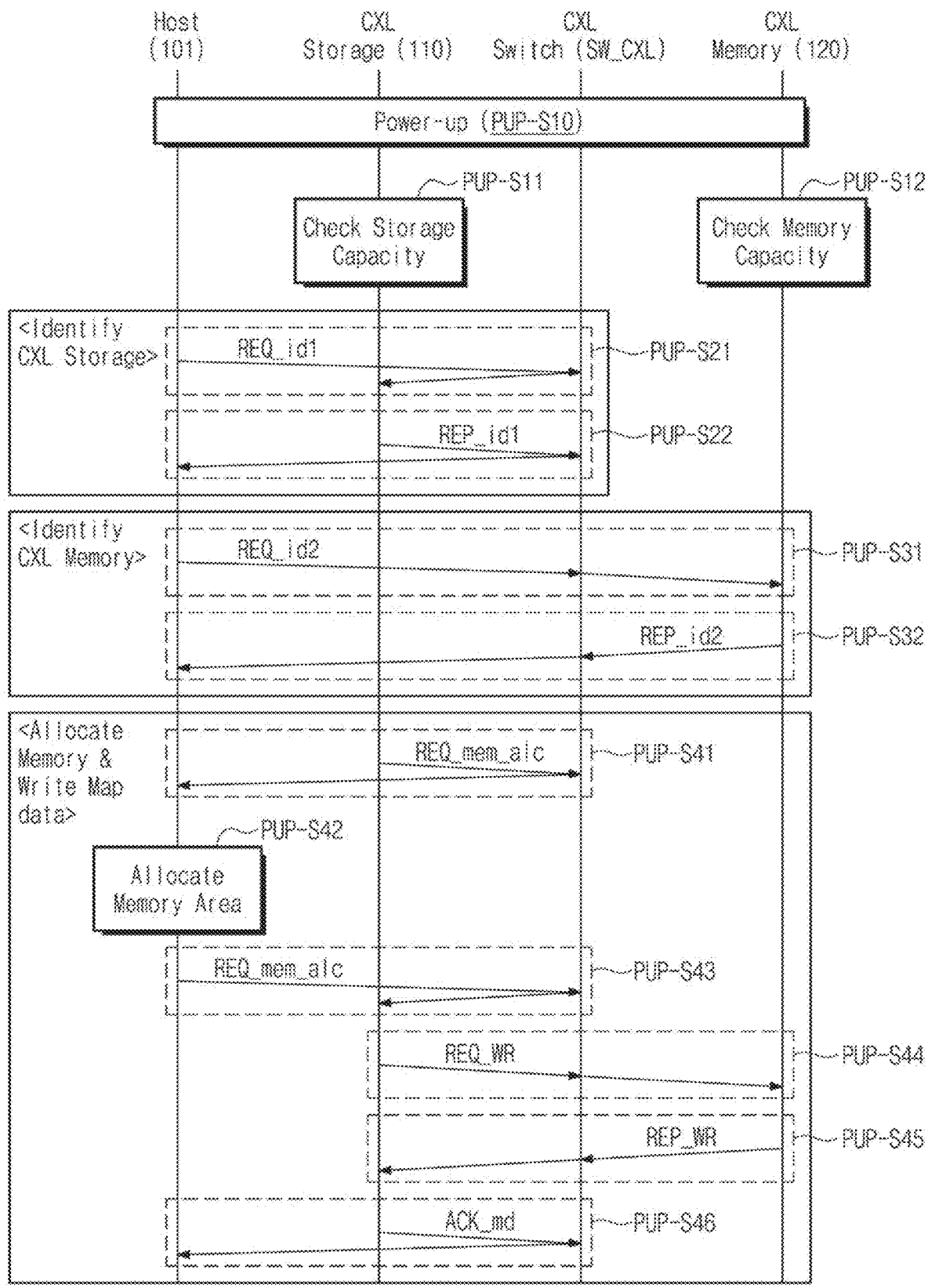
FIG. 4 is a flowchart illustrating an initialization operation or a power-up operation of a computing system of FIG. 3 according to an example embodiment.

FIG. 4 is a flowchart illustrating an initialization operation or a power-up operation of a computing system of FIG. 3 according to an example embodiment. Referring to FIGS. 3 and 4, in operation PUP-S10, the computing system 100 may be powered up. When the computing system 100 is powered up, the host 101 may send information about power-up or initialization start to the CXL storage 110, the CXL switch SW_CXL, and the CXL memory 120. In response to the information about power-up or initialization start, each of the CXL storage 110, the CXL switch SW_CXL, and the CXL memory 120 may perform an individual initialization operation.

In operation PUP-S11, the CXL storage 110 may check a storage capacity (i.e., a capacity of the nonvolatile memory NVM). For example, the CXL storage 110 may check the storage capacity of the nonvolatile memory NVM in response to the information about power-up or initialization start.

In operation PUP-S12, the CXL memory 120 may check a memory capacity (i.e., a capacity of the buffer memory BFM). For example, the CXL memory 120 may check the capacity of the buffer memory BFM in response to the information about power-up or initialization start.

The host 101 may identify information of the CXL storage 110 through operation PUP-S21 and operation PUP-522. For example, in operation PUP-521, the host 101 may issue a first device information request REQ_id1 for recognizing device information of the CXL storage 110 through the CXL host interface circuit 101a. The first device information request REQ_id1 may be transferred to the CXL switch SW_CXL. The CXL switch SW_CXL may transfer the first device information request REQ_id1 to the CXL storage 110 targeted for the first device information request REQ_id1.

In operation PUP-522, the CXL storage 110 may output a first device information response REP_id1 through the CXL storage interface circuit 111a in response to the first device information request REQ_id1 received from the CXL switch SW_CXL. The first device information response REP_id1 may be transferred to the CXL switch SW_CXL. The CXL switch SW_CXL may transfer the first device information response REP_id1 to the host 101 targeted for the first device information response REP_id1.

The host 101 may identify the device information of the CXL storage 110 in response to the first device information response REP_id1 received from the CXL switch SW_CXL. In an example embodiment, the first device information response REP_id1 may include information about a device type and a storage capacity of the CXL storage 110.

The host 101 may identify information of the CXL memory 120 through operation PUP-S31 and operation PUP-S32. For example, in operation PUP-S31, the host 101 may issue a second device information request REQ_id2 for recognizing device information of the CXL memory 120 through the CXL host interface circuit 101a. The second device information request REQ_id2 may be transferred to the CXL switch SW_CXL. The CXL switch SW_CXL may transfer the second device information request REQ_id2 to the CXL memory 120 targeted for the second device information request REQ_id2.

In operation PUP-S32, the CXL memory 120 may output a second device information response REP_id2 through the CXL memory interface circuit 121a in response to the second device information request REQ_id2 received from the CXL switch SW_CXL. The second device information response REP_id2 may be transferred to the CXL switch SW_CXL. The CXL switch SW_CXL may transfer the second device information response REP_id2 to the host 101 targeted for the second device information response REP_id2.

The host 101 may identify the device information of the CXL memory 120 in response to the second device information response REP_id2 received from the CXL switch SW_CXL. In an example embodiment, the second device information response REP_id2 may include information about a device type and a storage capacity of the CXL memory 120.

As described above, the host 101 may identify the information about the device types (e.g., a storage type or a memory type) and capacities of the CXL storage 110 and the CXL memory 120 through operation PUP-S21 to operation PUP-S32.

The host 101 may allocate at least a partial area of the CXL memory 120 for an area dedicated for the CXL storage 110 through operation PUP-S41 to operation PUP-S46. For example, in operation PUP-S41, the CXL storage 110 may output a memory allocation request REQ_mem_alc through the CXL storage interface circuit 111a. The memory allocation request REQ_mem_alc may be transferred to the CXL switch SW_CXL. The CXL switch SW_CXL may transfer the memory allocation request REQ_mem_alc to the host 101. In an example embodiment, the memory allocation request REQ_mem_alc may refer to an allocation request for an area, which is to be used as a dedicated area of the CXL storage 110, from among areas of the CXL memory 120.

In operation PUP-S42, the host 101 may allocate at least a partial area of the CXL memory 120 for the dedicated area of the CXL storage 110 in response to the memory allocation request REQ_mem_alc. For example, the host 101 may determine a buffer capacity required by the CXL storage 110 based on the storage capacity of the CXL storage 110. The host 101 may allocate the area of the CXL memory 120, which corresponds to the determined buffer capacity, for the dedicated area of the CXL storage 110.

In operation PUP-S43, the host 101 may output a memory allocation response REP_mem_alc through the CXL host interface circuit 101a. The memory allocation response REP_mem_alc may be transferred to the CXL switch SW_CXL. The CXL switch SW_CXL may transfer the memory allocation response REP_mem_alc to the CXL storage 110 targeted for the memory allocation response REP_mem_alc. In an example embodiment, the memory allocation response REP_mem_alc may include information about a device identifier of the CXL memory 120 and a memory address (e.g., a logical address range or a virtual address range) of an area of the CXL memory 120, which is allocated for a dedicated area of the CXL memory 120.

The CXL storage 110 may identify the area of the CXL memory 120, which is dedicated for the CXL storage 110, based on the memory allocation response REP_mem_alc.

In operation PUP-S44, the CXL storage 110 may output a write request REQ_WR through the CXL storage interface circuit 111a. The write request REQ_WR may be transferred to the CXL switch SW_CXL. The CXL switch SW_CXL may transfer the write request REQ_WR to the CXL memory 120 targeted for the write request REQ_WR. The CXL memory 120 may perform the write operation in response to the write request REQ_WR.

In operation PUP-S45, the CXL memory 120 may output, through the CXL memory interface circuit 121a, a write response REP_WR providing notification that the write request is completed. The CXL switch SW_CXL may transfer the write response REP_WR to the CXL storage 110 targeted for the write response REP_WR. The CXL storage 110 may recognize that the write operation is completely performed on the CXL memory 120, in response to the write response REP_WR.

In an example embodiment, the write request REQ_WR may refer to a request for storing the map data MD present in the nonvolatile memory NVM of the CXL storage 110 in the dedicated area of the CXL memory 120. That is, the write request REQ_WR may include address information about the map data MD and the dedicated area. Through operation PUP-S44 and operation PUP-S45, the map data MD present in the CXL storage 110 may be stored in the dedicated area of the CXL memory 120.

In operation PUP-S46, the CXL storage 110 may output acknowledge information ACK_md through the CXL storage interface circuit 111a. The CXL switch SW_CXL may transfer the acknowledge information ACK_md to the host 101. In response to the acknowledge information ACK_md, the host 101 may recognize that the CXL storage 110 stores the map data MD in the CXL memory 120. The host 101, the CXL storage 110, and the CXL memory 120 may perform a normal operation (e.g., a read operation or a write operation).

Figure 5:
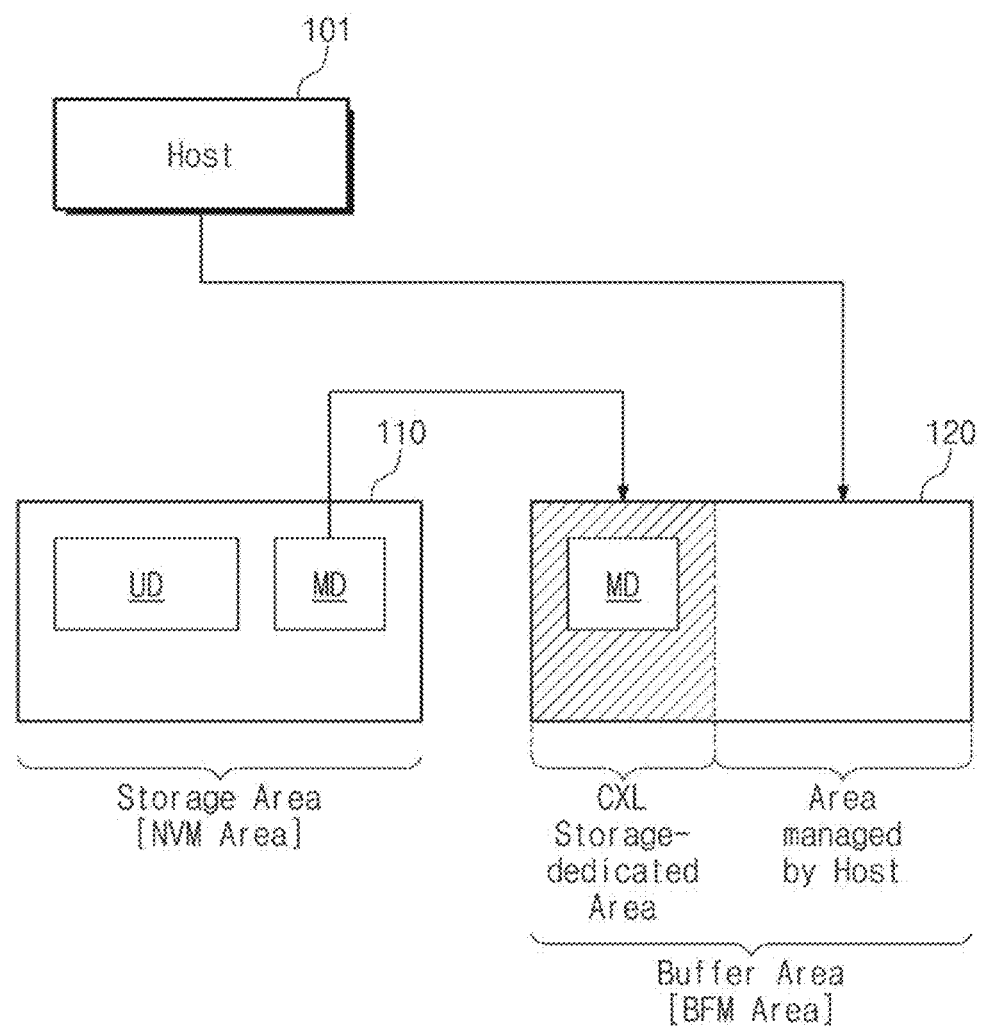
FIG. 5 is a diagram of an operation in which a computing system stores map data according to an example embodiment.

FIG. 5 is a diagram of an operation in which a computing system stores map data according to an example embodiment. For convenience of description and for brevity of drawing, components of the host 101, the CXL storage 110, and the CXL memory 120 are conceptually illustrated, and some components are omitted.

Referring to FIGS. 3 to 5, the host 101 may allocate a partial area of the CXL memory 120 for a dedicated area of the CXL storage 110. In this case, the dedicated area of the CXL memory 120 may be accessed by the CXL storage 110 and may be used to store map data of the CXL storage 110.

For example, as illustrated in FIG. 5, the nonvolatile memory NVM of the CXL storage 110 may store the user data UD and the map data MD. As described above, because the CXL storage 110 does not include a separate buffer memory, the CXL storage 110 may require a buffer area in which the map data MD are to be stored. According to an example embodiment of the present disclosure, the map data MD of the CXL storage 110 may be stored in a partial area (e.g., a dedicated area allocated by the host 101) of the CXL memory 120. In this case, the dedicated area of the CXL memory 120 may be accessed by the CXL storage 110 through the CXL switch SW_CXL.

In an example embodiment, the remaining area of the CXL memory 120, which is not allocated, other than the dedicated area may be an area that is accessible by the host 101 or is managed by the host 101. In this case, the host 101 may access the remaining area of the CXL memory 120 through the CXL switch SW_CXL. In an example embodiment, the remaining area of the CXL memory 120, which is not allocated for the dedicated area, may be used as a memory expander.

As described above, depending on the request of the CXL storage 110, the host 101 may allocate at least a partial area of the CXL memory 120 for the dedicated area of the CXL storage 110. In this case, the CXL storage 110 may access a portion of the CXL memory 120, which is allocated for the dedicated area, and the host 101 may access the remaining area of the CXL memory 120 (i.e., the remaining area other than the dedicated area thus allocated). In an example embodiment, both the access of the CXL storage 110 to the CXL memory 120 and the access of the host 101 to the CXL memory 120 may be performed through the same interface (e.g., a CXL interface or a CXL switch).

In an example embodiment, when the system memory of the host 101 is insufficient, the host 101 may retrieve (or recover) the dedicated area of the CXL memory 120, which is allocated to the CXL storage 110 (i.e., an area for storing map data). The retrieved (or recovered) dedicated area may be used as the system memory by the host 101.

Figure 6:
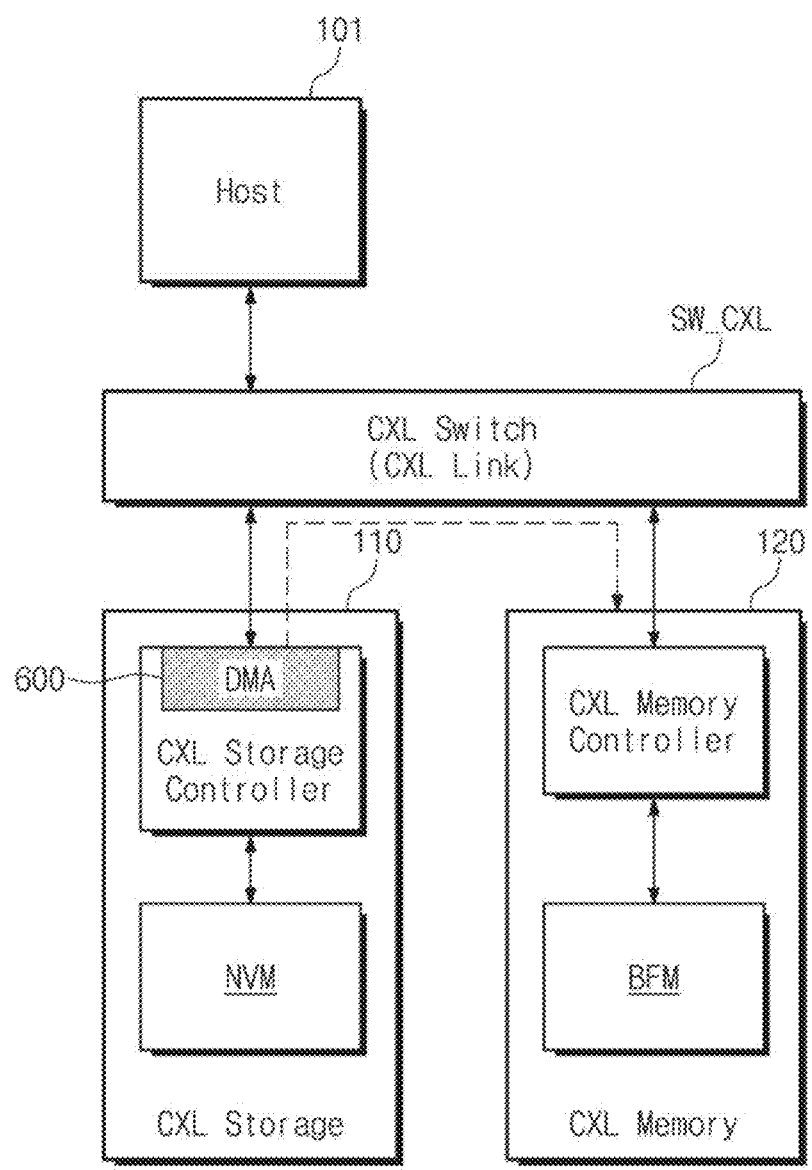
FIGS. 6 and 7 are diagrams of an operation in which map data are stored in a compute express link (CXL) memory according to an example embodiment.
Figure 7:
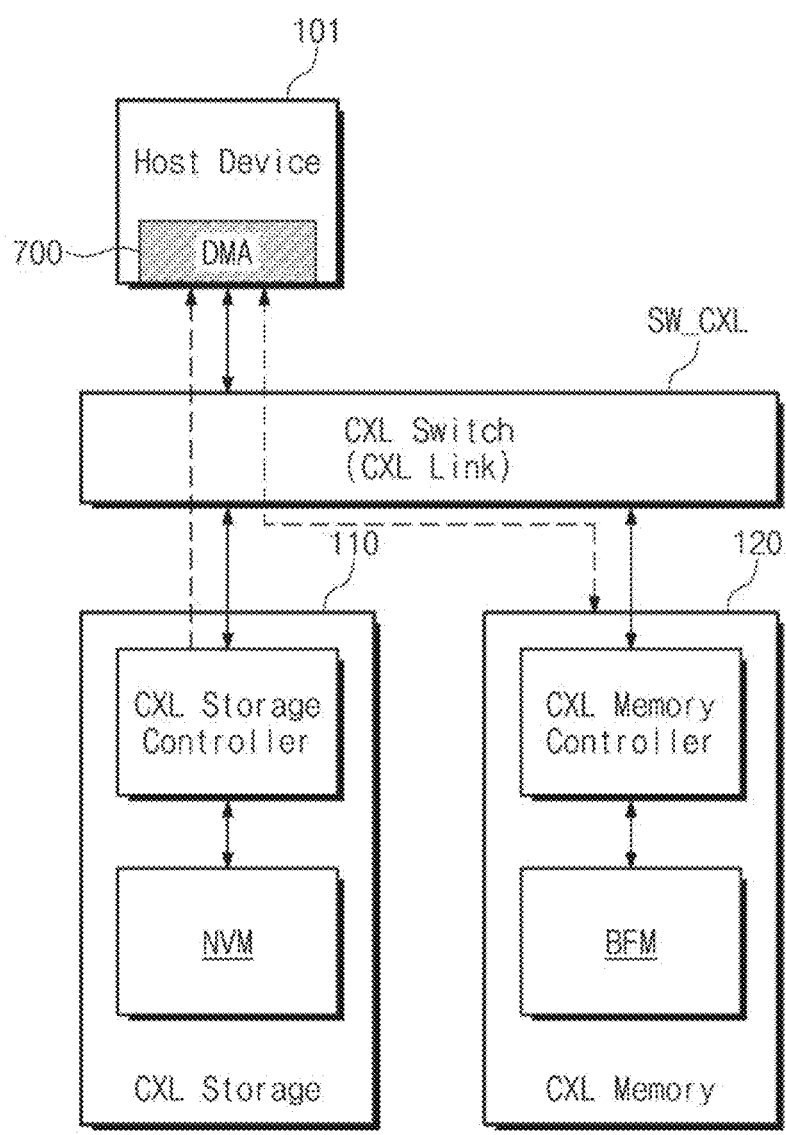

FIGS. 6 and 7 are diagrams of an operation in which map data are stored in a CXL memory according to an example embodiment. In an example embodiment, the map data MD present in the CXL storage 110 may be transferred and stored to the CXL memory 120 from the CXL storage 110 through various manners.

As an example, the CXL storage 110 and the CXL memory 120 may exchange the map data MD based on a peer-to-peer (P2P) manner. For example, as illustrated in FIG. 6, the CXL storage controller 111 of the CXL storage 110 may include a direct memory access (DMA) engine 600. The DMA engine 600 included in the CXL storage controller 111 may transfer the map data MD present in the nonvolatile memory NVM to the CXL memory 120 without the interference or control of the host 101. That is the map data MD may be transferred from the CXL storage 110 to the CXL memory 120 based on the P2P manner.

As an example, under control of the host 101, the CXL storage 110 and the CXL memory 120 may exchange the map data MD based on the DMA manner. For example, as illustrated in FIG. 7, the host 101 may include a DMA engine 700. The DMA engine 700 of the host 101 may read the map data MD from the CXL storage 110 and may transfer the map data MD thus read to the CXL memory 120. In an example embodiment, the DMA engine 700 of the host 101 may read the map data MD from the CXL storage 110 based on the CXL.io and may transfer the map data MD to the CXL memory 120 based on the CXL.mem.

The above manners in which map data are transferred from the CXL storage 110 to the CXL memory 120 are provided as an example, and the disclosure is not limited thereto. It may be understood that the transfer of map data from the CXL storage 110 to the CXL memory 120 is implemented in various manners using the CXL interface or the CXL switch. In an example embodiment, the transfer (i.e., the backup or flush) of map data from the CXL memory 120 to the CXL storage 110 may also be implemented in a manner(s) similar to the above manners.

Figure 8:
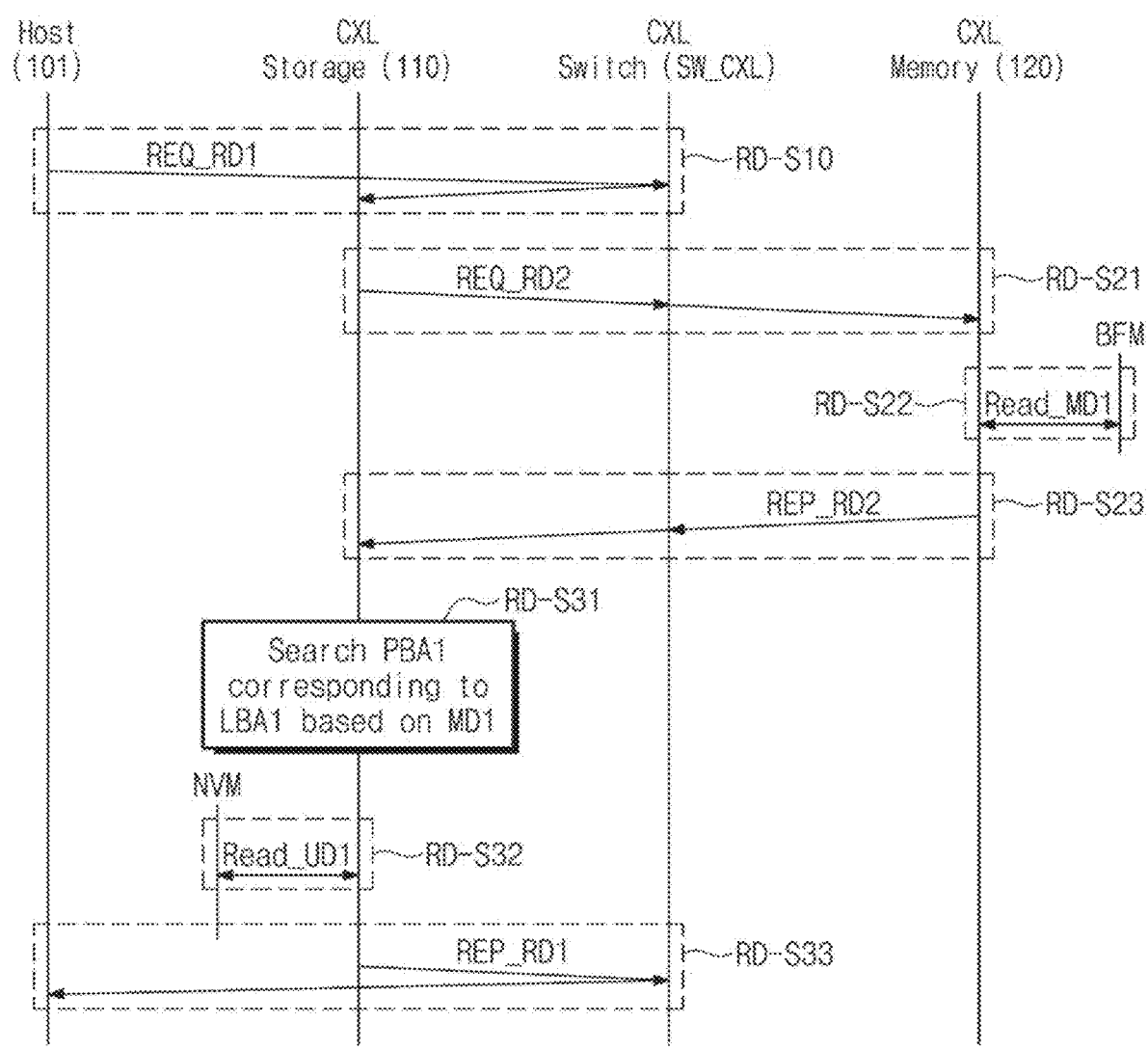
FIG. 8 is a flowchart illustrating a read operation for CXL storage of FIG. 2 according to an example embodiment.

FIG. 8 is a flowchart illustrating a read operation for CXL storage of FIG. 2 according to an example embodiment. In an example embodiment, the read operation for the CXL storage 110 according to the flowchart of FIG. 8 may be performed after the initialization operation of FIG. 4 is performed (i.e., after the map data MD of the CXL storage 110 are stored in the dedicated area of the CXL memory 120).

Referring to FIGS. 2, 3, and 8, in operation RD-S10, the host 101 may output a first read request REQ_RD1 through the CXL host interface circuit 101a. The CXL switch SW_CXL may transfer the first read request REQ_RD1 to the CXL storage 110 targeted for the first read request REQ_RD1. In an example embodiment, the first read request REQ_RD1 may refer to a request for reading first user data UD1 stored in the CXL storage 110 and may include a first logical block address LBA1 corresponding to the first user data UD1.

In operation RD-S21, the CXL storage 110 may output a second read request REQ_RD2 through the CXL storage interface circuit 111*a* in response to the first read request REQ_RD1. The CXL switch SW_CXL may transfer the second read request REQ_RD2 to the CXL memory 120. In an example embodiment, the second read request REQ_RD2 may refer to a request for reading first map data MD1 corresponding to the first logical block address LBA1. That is, the second read request REQ_RD2 may refer to a request for reading the first map data MD1 from the CXL memory 120. The second read request REQ_RD2 may include information about a memory address (e.g., a logical address or a virtual address) of the CXL memory 120, which indicates an area where the first map data MD1 are stored.

In operation RD-S22, the CXL memory 120 may read the first map data MD1 in response to the second read request REQ_RD2. For example, the CXL memory controller 121 of the CXL memory 120 may read the first map data MD1 from an area corresponding to a memory address (e.g., a logical address or a virtual address) included in the second read request REQ_RD2. In an example embodiment, the CXL memory controller 121 may read the first map data MD1 from the buffer memory BFM by using the buffer memory interface circuit 121*d*.

In an example embodiment, the first map data MD1 read in operation RD-S22 may be a portion of the entire map data MD and may be map data corresponding to the first logical block address LBA1. That is, the first map data MD1 may include information about a first physical block address PBA1 corresponding to the first logical block address LBA1.

In operation RD-S23, the CXL memory 120 may output a second read response REP_RD2 including the first map data MD1 through the CXL memory interface circuit 121*a*. The CXL switch SW_CXL may transfer a second read response REP_RD2 to the CXL storage 110. In an example embodiment, the first map data MD1 included in the second read response REP_RD2 received through the CXL switch SW_CXL may be stored or temporarily stored in the RAM 111*c* of the CXL storage controller 111.

In an example embodiment, when the first map data MD1 corresponding to the first logical block address LBA1 is already present in the RAM 111*c* of the CXL storage controller 111, operation RD-S21 to operation RD-S23 (i.e., operations for loading the first map data MD1 from the CXL memory 120) may be omitted.

In operation RD-S31, the CXL storage 110 may search for the first physical block address PBA1 corresponding the first logical block address LBA1 based on the first map data MD1. For example, the FTL 111*d* of the CXL storage controller 111 may search for the first physical block address PBA1 corresponding to the first logical block address LBA1 based on the first map data MD1.

In operation RD-S32, the CXL storage 110 may read the first user data UD1 present in an area corresponding to the first physical block address PBA1 from the nonvolatile memory NVM. For example, the CXL storage controller 111 may read the first user data UD1 from the area of the nonvolatile memory NVM, which corresponds to the first physical block address PBA1. In an example embodiment, the CXL storage controller 111 may read the first user data UD1 from the nonvolatile memory NVM by using the NAND interface circuit 111*f*.

In operation RD-S33, the CXL storage 110 may output a first read response REP_RD1 to the first read request REQ_RD1 through the CXL storage interface circuit 111*a*. The CXL switch SW_CXL may transfer the first read response REP_RD1 to the host 101. In an example embodiment, the first read response REP_RD1 may include the first user data UD1 requested through the first read request REQ_RD1. The host 101 may obtain the first user data UD1 through the first read response REP_RD1.

In an example embodiment, operation RD-S10 and operation RD-S33 corresponding to the communications between the host 101 and the CXL storage 110 may be performed based on the CXL.io, and operation RD-S21 and operation RD-S23 corresponding to the communications between the CXL storage 110 and the CXL memory 120 may be performed based on the CXL.mem. However, the present disclosure is not limited thereto. For example, the communications between the host 101, the CXL storage 110, and the CXL memory 120 may be performed through the CXL switch SW_CXL (i.e., a common interface, a common link, or a common switch).

Figure 9:
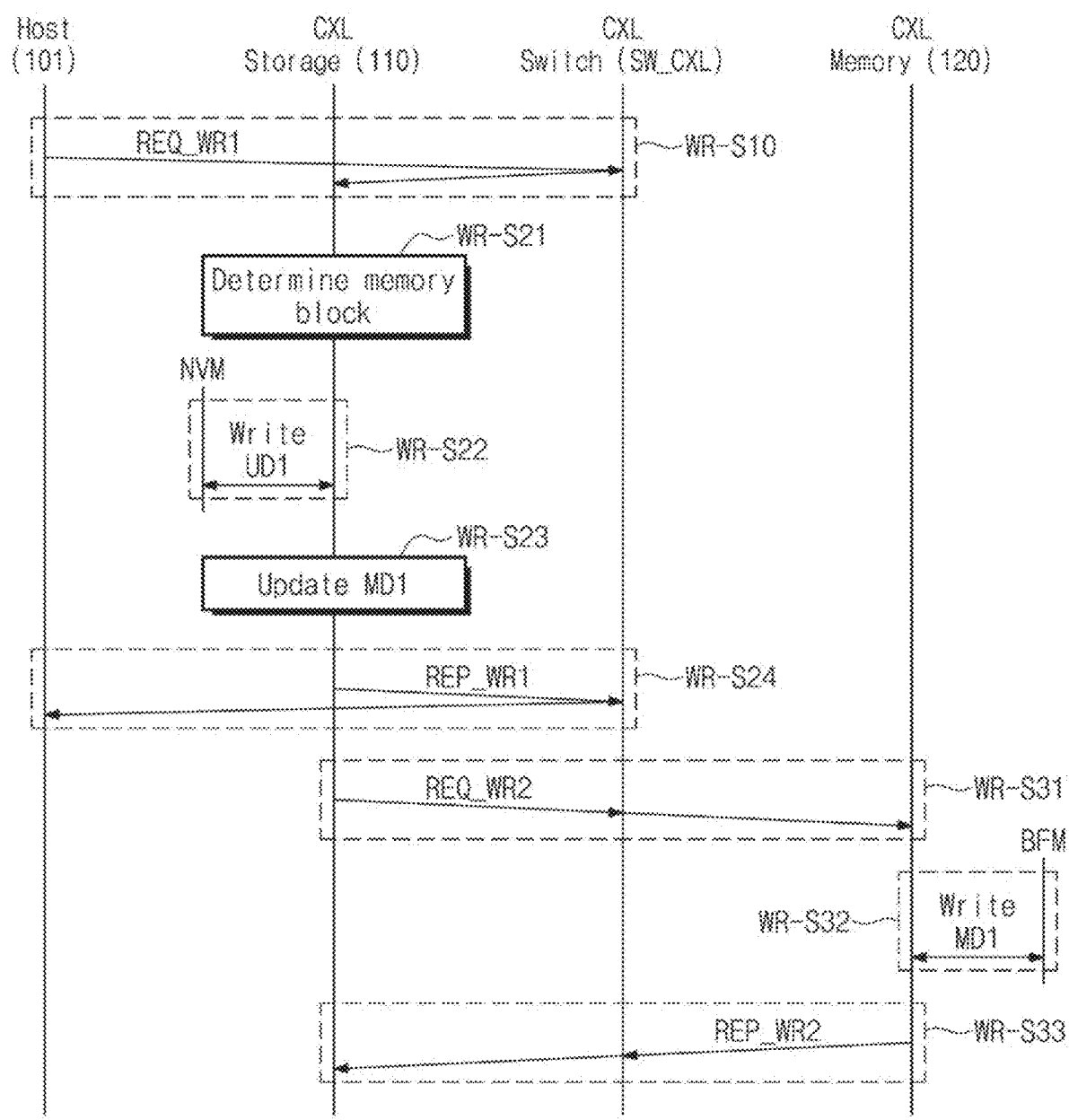
FIG. 9 is a flowchart illustrating a write operation for CXL storage of FIG. 2 according to an example embodiment.

FIG. 9 is a flowchart illustrating a write operation for CXL storage of FIG. 2 according to an example embodiment. In an example embodiment, the write operation for the CXL storage 110 according to the flowchart of FIG. 9 may be performed after the initialization operation of FIG. 4 is performed (i.e., after the map data MD of the CXL storage 110 are stored in the dedicated area of the CXL memory 120).

Referring to FIGS. 2, 3, and 9, in operation WR-S10, the host 101 may output a first write request REQ_WR1 through the CXL host interface circuit 101*a*. The CXL switch SW_CXL may transfer the first write request REQ_WR1 to the CXL storage 110. In an example embodiment, the first write request REQ_WR1 may refer to a request for writing the first user data UD1 in the CXL storage 110.

In operation WR-S21, the CXL storage 110 may determine a memory block in which the first user data UD1 are to be written, in response to the first write request REQ_WR1. For example, the FTL 111*d* of the CXL storage controller 111 may manage block information about a memory block, which is free, capable of being written, or capable of being allocated, from among memory blocks included in the nonvolatile memory NVM. The FTL 111*d* may select a memory block, in which the first user data UD1 are to be written, based on the block information.

In operation WR-S22, the CXL storage 110 may write the first user data UD1 in the selected memory block. For example, the CXL storage controller 111 may control the nonvolatile memory NVM such that the first user data UD1 are written in the selected memory block. In an example embodiment, the CXL storage controller 111 may write the first user data UD1 in the nonvolatile memory NVM by using the NAND interface circuit 111*f*.

When the first user data UD1 are completely written in the nonvolatile memory NVM (i.e., when a program operation for the nonvolatile memory NVM is passed), in operation WR-S33, the CXL storage 110 may update the first map data MD1 or may generate the first map data MD1. For example, the first map data MD1 may include information indicating that the first user data UD1 corresponding to the first logical block address LBA1 are stored in an area of the nonvolatile memory NVM, which corresponds to the first physical block address PBA1. That is, the CXL storage 110 may generate the first map data MD1 indicating that the first user data UD1 corresponding to the first logical block address LBA1 are stored in the area corresponding to the first physical block address PBA1.

In operation WR-S24, the CXL storage 110 may output a first write response REP_WR1 to the first write request REQ_WR1 through the CXL storage interface circuit 111*a*.

The CXL switch SW_CXL may transfer the first write response REP_WR1 to the host 101. In response to the first write response REP_WR1, the host 101 may determine that the first user data UD1 corresponding to the first write request REQ_WR1 are normally stored in the CXL storage 110.

After the write operation for the CXL storage 110 requested by the host 101 is completed, the CXL storage 110 may perform a map data update operation. For example, in operation WR-S31, the CXL storage 110 may output a second write request REQ_WR2 through the CXL storage interface circuit 111a. The CXL switch SW_CXL may transfer the second write request REQ_WR2 to the CXL memory 120.

In an example embodiment, the second write request REQ_WR2 may refer to a request for writing the first map data MD1, which are updated or generated as the first user data UD1 are stored, in the CXL memory 120. The second write request REQ_WR2 may include a memory address at which the first map data MD1 are to be stored. The memory address included in the second write request REQ_WR2 may indicate the area of the CXL memory 120, which is dedicated for the CXL storage 110.

In operation WR-S32, the CXL memory 120 may store the first map data MD1 in the corresponding area in response to the second write request REQ_WR2. For example, the CXL memory 120 may write the first map data MD1 in the area corresponding to the memory address included in the second write request REQ_WR2.

In operation WR-S33, the CXL memory 120 may output a second write response REP_WR2 to the second write request REQ_WR2 through the CXL memory interface circuit 121a. The CXL switch SW_CXL may transfer the second write response REP_WR2 to the CXL storage 110.

In an example embodiment, operation WR-S31 to operation WR-S33 (i.e., an operation of storing map data in the CXL memory 120 or an operation of updating map data) may be performed whenever the write operation for the CXL storage 110 is completed. Alternatively, operation WR-S31 to operation WR-S33 may be performed when the size of map data updated or newly generated reaches a given value. Alternatively, operation WR-S31 to operation WR-S33 may be performed periodically. However, the present disclosure is not limited thereto. For example, map data that are generated or updated during the operation of the CXL storage 110 may be stored in the CXL memory 120 depending on various operation policies.

Figure 10:
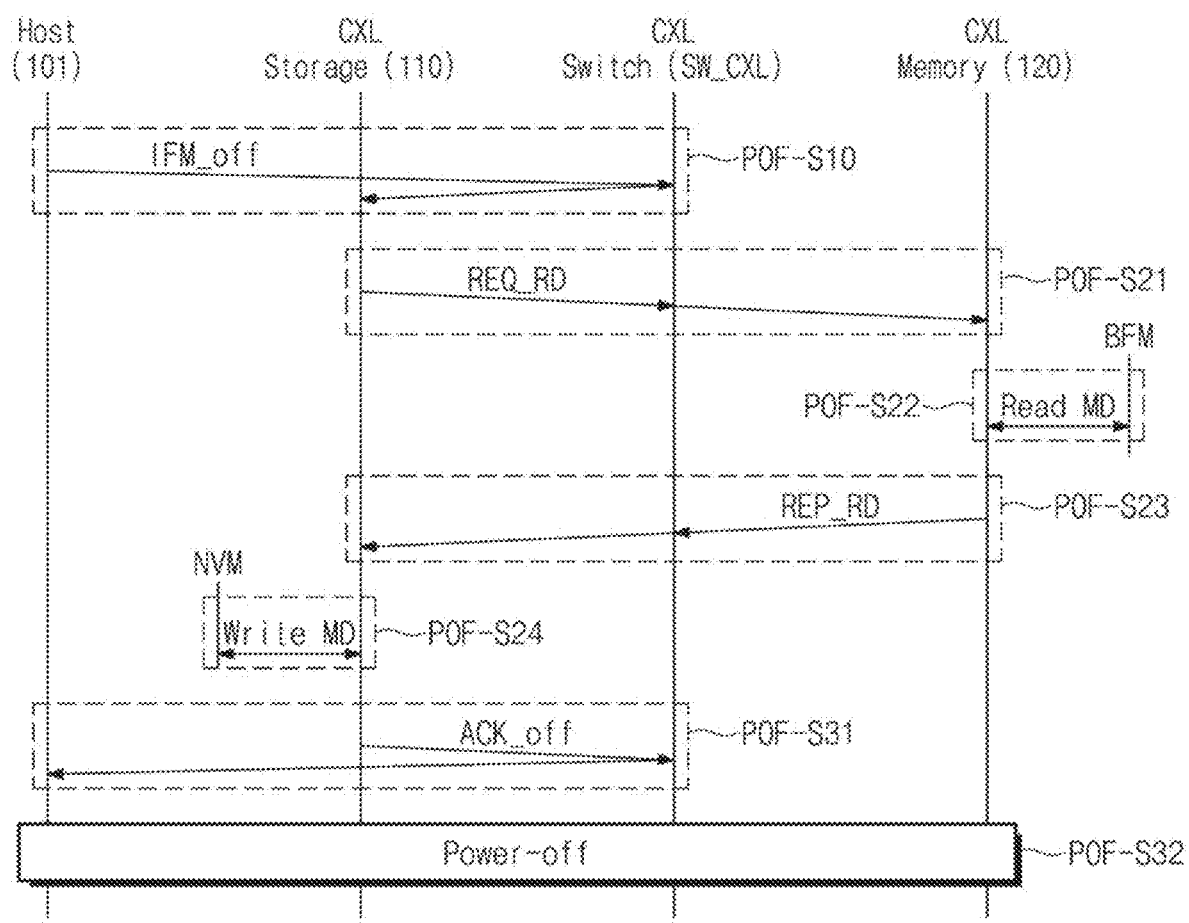
FIG. 10 is a flowchart illustrating a power-off operation of a computing system of FIG. 2 according to an example embodiment.

FIG. 10 is a flowchart illustrating a power-off operation of a computing system of FIG. 2 according to an example embodiment. In an example embodiment, a power-off operation of a computing system will be described with reference to FIG. 10, but the present disclosure is not limited thereto. For example, it may be understood that the operating method of FIG. 10 is applicable to the power-off operation or reset operation of each of various components (e.g., a host, CXL storage, a CXL memory, and a CXL switch) included in the computing system.

Referring to FIGS. 2 and 10, in operation POF-S10, the host 101 may output power-off information IFM_off through the CXL host interface circuit 101a. The CXL switch SW_CXL may transfer the power-off information IFM_off to the CXL storage 110. For example, the host 101 may recognize or detect information about power-off of the computing system 100. The host 101 may send the power-off information IFM_off to the CXL storage 110 through the CXL switch SW_CXL such that the CXL storage 110 performs a power-off operation.

In operation POF-S21, the CXL storage 110 may output a read request REQ_RD through the CXL storage interface circuit 111a in response to the power-off information IFM_off. The CXL switch SW_CXL may transfer the read request REQ_RD to the CXL memory 120. In an example embodiment, the read request REQ_RD in operation POF-S21 may refer to a request for reading the entire map data MD stored in the CXL memory 120. The read request REQ_RD may include a memory address of an area where the map data MD are stored.

In operation POF-S22, the CXL memory 120 may read the map data MD in response to the read request REQ_RD. For example, the CXL memory 120 may read the map data MD from the buffer memory BFM based on the memory address included in the read request REQ_RD.

In operation POF-S23, the CXL memory 120 may output a read response REP_RD to the read request REQ_RD through the CXL memory interface circuit 121a. The CXL switch SW_CXL may transfer the read response REP_RD to the CXL storage 110.

In operation POF-S24, the CXL storage 110 may write the map data MD included in the read response REP_RD in the nonvolatile memory NVM. In an example embodiment, the CXL storage 110 may store the map data MD in a given area of the nonvolatile memory NVM.

After the entire map data MD associated with the CXL storage 110 are stored in the nonvolatile memory NVM, in operation POF-S31, the CXL storage 110 may output a response ACK_off to the power-off information IFM_off. The CXL switch SW_CXL may send the response ACK_off to the host 101. The host 101 may recognize that the map data MD present in the CXL memory 120 are normally stored in the CXL storage 110, based on the response ACK_off.

In operation POF-S32, the host 101, the CXL storage 110, the CXL memory 120, and the CXL switch SW_CXL may be powered off. For example, a power that is provided to the host 101, the CXL storage 110, the CXL memory 120, and the CXL switch SW_CXL may be interrupted.

The power-off operation described with reference to FIG. 10 is provided as an example, and the present disclosure is not limited thereto. For example, in the example embodiment of FIG. 10, after the CXL storage 110 stores the map data MD present in the CXL memory 120 in the nonvolatile memory NVM, the CXL storage 110 may provide notification that the map data MD are completely backed up, by sending acknowledge ACK_off to the host 101 (i.e., an interrupt manner). Alternatively, the CXL storage 110 may set a value of a specific register to a given value after storing the map data MD present in the CXL memory 120 in the nonvolatile memory NVM. The host 101 may check whether the map data MD are completed backed up, by periodically checking the value of the specific register of the CXL storage 110 (i.e., a polling manner). Alternatively, the CXL storage 110 may be configured to complete a backup operation for the map data MD within a given time from a point in time when the power-off information IFM_off is received from the host 101 (i.e., a time-out manner). As described above, the CXL storage 110 may transfer information about backup completion of the map data MD to the host 101 through at least one of various manners.

In an example embodiment, the power-off operation may be changed depending on an operation manner of the CXL storage 110. For example, when the CXL storage 110 performs the write operation, the CXL storage 110 may perform the program operation on the nonvolatile memory NVM and thus may update the map data MD.

In an example embodiment, the operation of updating the map data MD may be performed only on the CXL memory 120. In this case, the map data MD stored in the CXL memory 120 may be up-to-date information, and the map data MD stored in the nonvolatile memory NVM may not be up-to-date information. That is, when the operation of updating the map data MD is performed only on the CXL memory 120, up-to-date information about the map data MD is maintained only in the CXL memory 120. For this reason, when the CXL storage 110, the CXL memory 120, or the computing system 100 is powered off, an operation of flushing, backing up, or dumping the map data MD from the CXL memory 120 is required.

In an example embodiment, the map data MD update operation may be first performed with respect to the map data MD stored in the nonvolatile memory NVM and may then be performed with respect to the map data MD stored in the CXL memory 120 through the background operation. In this case, because the map data MD stored in the nonvolatile memory NVM are guaranteed to be up-to-date, the operation of flushing, dumping, or backing up the map data MD from the CXL memory 120 may not be required when the CXL storage 110, the CXL memory 120, or the computing system 100 is powered off.

In an example embodiment, the map data update operation may be first performed with respect to the map data MD stored in the CXL memory 120 and may then be performed with respect to the map data MD stored in the nonvolatile memory NVM through the background operation. In this case, the map data MD stored in the CXL memory 120 may be up-to-date information, and the map data MD stored in the nonvolatile memory NVM may not be up-to-date information. As such, when the CXL storage 110, the CXL memory 120, or the computing system 100 is powered off, at least a portion of the map data MD of the CXL memory 120 has to be backed up to the nonvolatile memory NVM of the CXL storage 110. In an example embodiment, at least a portion of the map data MD to be backed up to the nonvolatile memory NVM may be the up-to-date map data MD that are not stored in the nonvolatile memory NVM. In an example embodiment, the CXL storage 110 may manage or store flag information or table information indicating that the map data MD stored in the nonvolatile memory NVM are up-to-date information.

As described above, when the CXL storage 110, the CXL memory 120, or the computing system 100 is powered off, depending on a way to manage the map data MD (i.e., depending on a place where up-to-date information is managed), the map data MD may be selectively flushed, backed up, or dumped to the CXL storage 110 from the CXL memory 120.

Figure 11A:
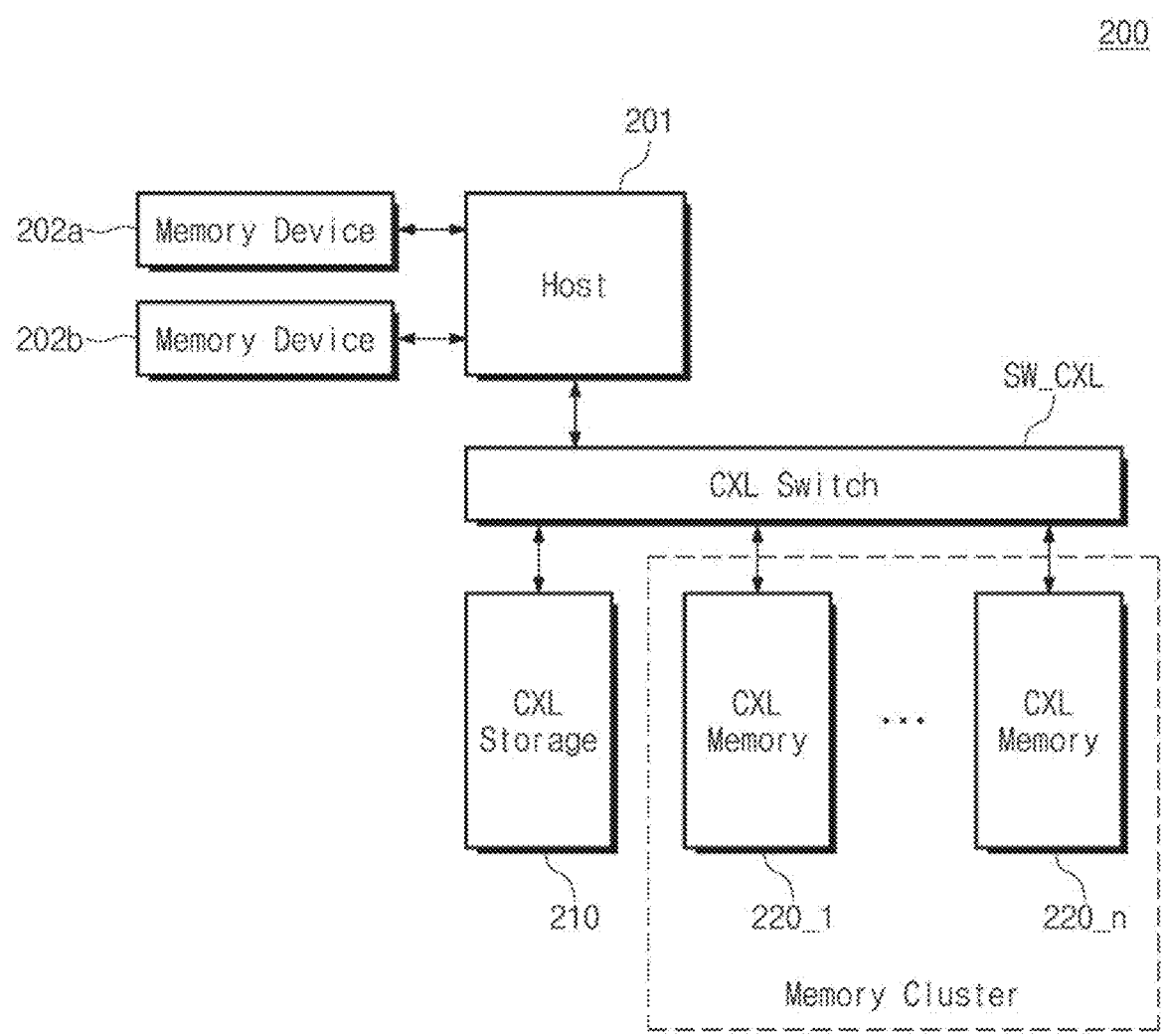
FIG. 11A is a block diagram illustrating a computing system according to an example embodiment.

FIG. 11A is a block diagram illustrating a computing system according to an example embodiment. Below, for convenience of description, additional description associated with the components described above will be omitted to avoid redundancy. Referring to FIG. 11A, a computing system 200 may include a host 201, a plurality of memory devices 202a and 202b, the CXL switch SW_CXL, CXL storage 210, and a plurality of CXL memories 220_1 to 220_n.

The host 201 may be directly connected with the plurality of memory devices 202a and 202b. The host 201, the CXL storage 210, and the plurality of CXL memories 220_1 to 220_n may be connected with the CXL switch SW_CXL and may communicate with each other through the CXL switch SW_CXL.

In an example embodiment, each of the plurality of CXL memories 220_1 to 220_n may have a structure similar to that of the CXL memory 120 described with reference to FIGS. 2 to 10. That is, each of the plurality of CXL memories 220_1 to 220_n may be implemented with an individual memory device or memory module and may be connected with the CXL switch SW_CXL through different physical ports. That is, as the plurality of CXL memories 220_1 to 220_n are connected with the CXL switch SW_CXL, a memory area (or capacity) that is managed by the host 201 may increase.

In an example embodiment, the host 201 may manage the plurality of CXL memories 220_1 to 220_n as one memory cluster. In an example embodiment, the host 201 may allocate at least some of the plurality of CXL memories 220_1 to 220_n for a memory dedicated for the CXL storage 210. Alternatively, the host 201 may allocate at least a partial area of each of the plurality of CXL memories 220_1 to 220_n for a memory dedicated for the CXL storage 210.

Figure 11B:
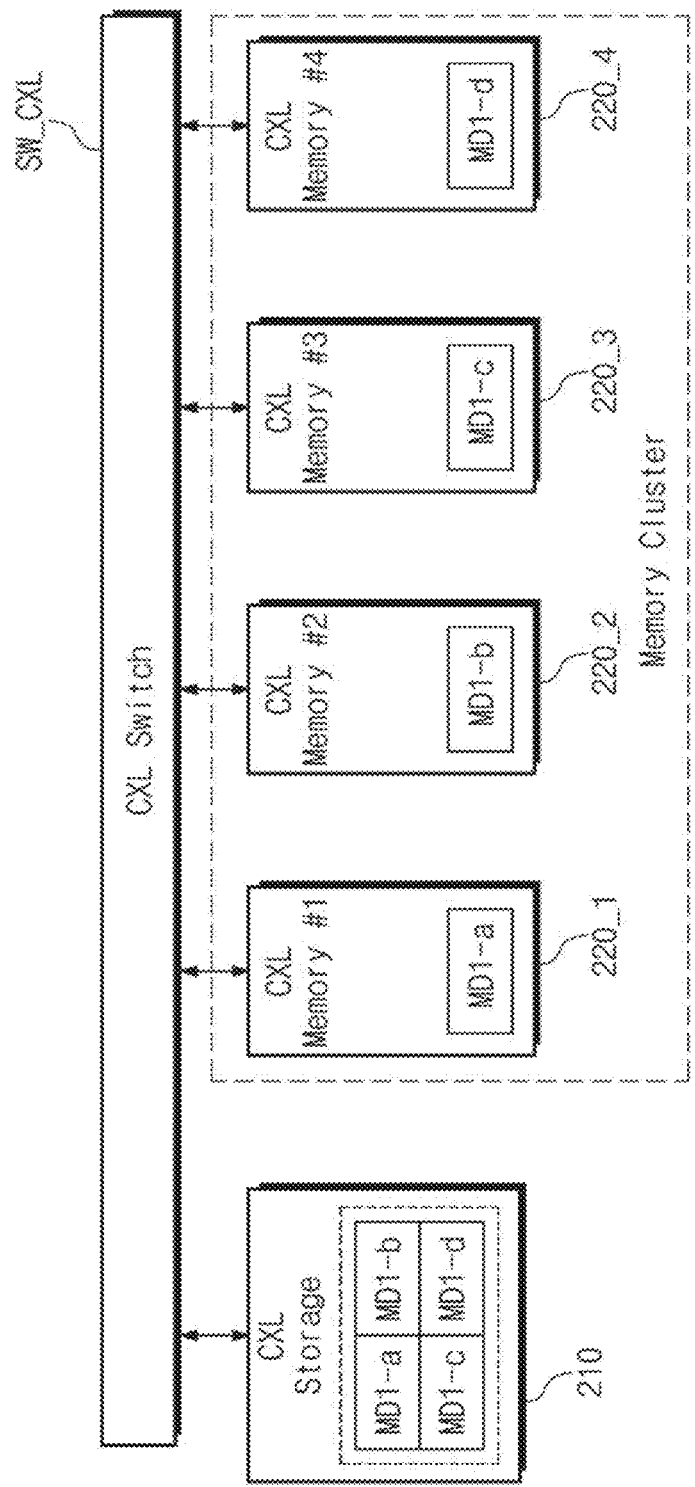
FIGS. 11B and 11C are diagrams of an operation of a computing system of FIG. 11A according to an example embodiment.
Figure 11C:
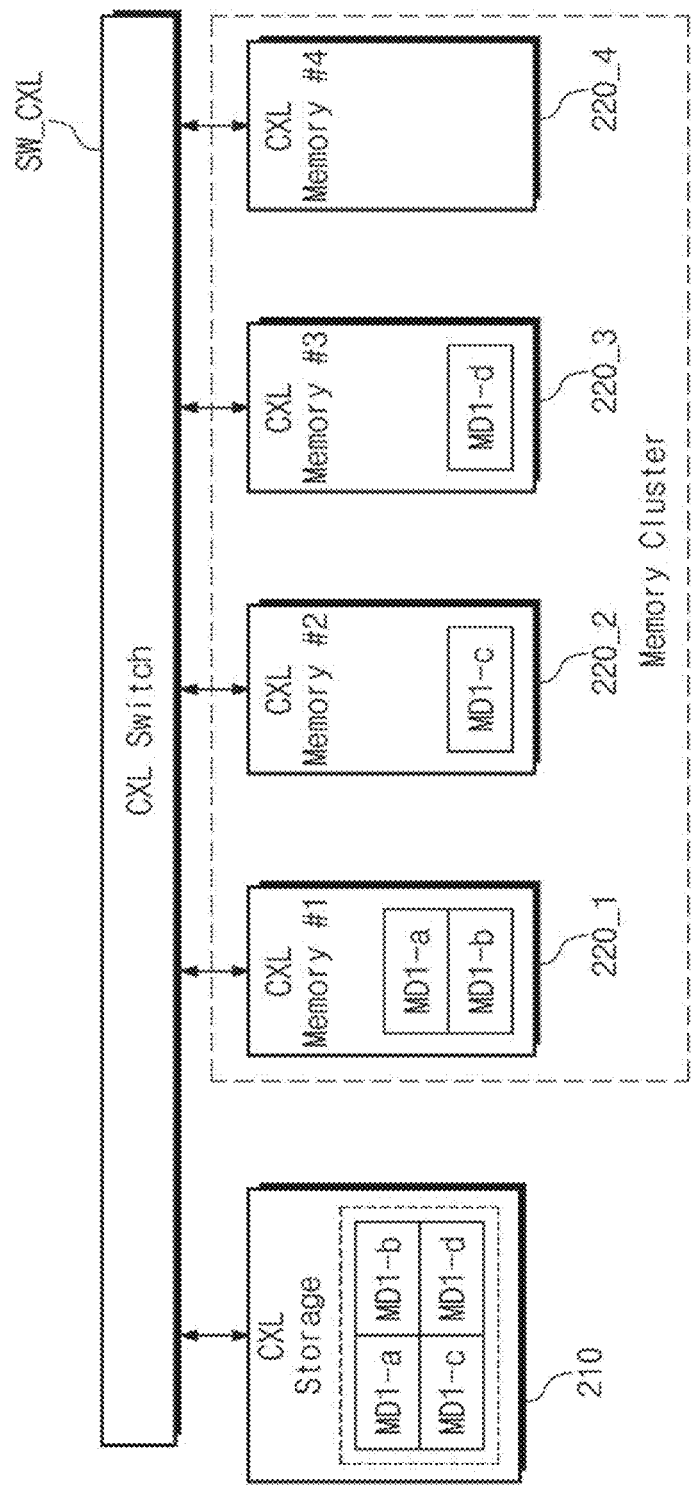

FIGS. 11B and 11C are diagrams of an operation of a computing system of FIG. 11A according to an example embodiment. Referring to FIGS. 4, 11A, 11B, and 11C, the host 201 may allocate at least some of memory areas of the plurality of CXL memories 220_1 to 220_4 (or a memory cluster) for a memory or a memory area dedicated for the CXL storage 210, based on the initialization operation described with reference to FIG. 4.

For example, the CXL storage 210 may manage user data (i.e., data stored in the CXL storage 210) by using the first map data MD1. In this case, the first map data MD1 may be stored in the areas allocated for the memory area dedicated for the CXL storage 210 from among the memory areas of the plurality of CXL memories 220_1 to 220_4 (or a memory cluster), and may be exchanged between the CXL storage 210 and the plurality of CXL memories 220_1 to 220_4 based on the methods described with reference to FIGS. 2 to 10.

In an example embodiment, the plurality of CXL memories 220_1 to 220_4 (or a memory cluster) may be allocated to the CXL storage 210 based on various manners. For example, as illustrated in FIG. 11B, the first map data MD1 may be divided into four sub-map data MD1-a, MD1-b, MD1-c, and MD1-d. The four sub-map data MD1-a, MD1-b, MD1-c, and MD1-d may be respectively stored in the plurality of CXL memories 220_1 to 220_4. The CXL storage 210 may perform the operations described with reference to FIGS. 2 to 10 by independently accessing the four sub-map data MD1-a, MD1-b, MD1-c, and MD1-d stored in the plurality of CXL memories 220_1 to 220_4.

In an example embodiment, the four sub-map data MD1-a, MD1-b, MD1-c, and MD1-d may have the same size. That is, memory areas of the plurality of CXL memories 220_1 to 220_4 that the host 201 allocates to the CXL storage 210 may have the same size. For example, it is assumed that the size of the first map data MD1 used in the CXL storage 210 is 1 TB and the plurality of CXL memories 220_1 to 220_4 have sizes of 512 GB, 512 GB, 256 GB, and 256 GB, respectively. In this case, the host 201 may allocate the 256 GB memory areas of the plurality of CXL memories 220_1 to 220_4 to the CXL storage 210. The CXL storage 210 may divide the first map data MD1 into the four sub-map data MD1-a, MD1-b, MD1-c, and MD1-d having the same size (i.e., the size of 256 GB) and may store the four sub-map data MD1-a, MD1-b, MD1-c, and MD1-d in the memory areas allocated from the plurality of CXL memories 220_1 to 220_4, respectively. In an example embodiment, a memory area (e.g., 256 GB) not allocated to the CXL storage 210 (e.g., the remaining memory area (e.g., 256 GB) of the first CXL memory 220_1 and the remaining memory area (e.g., 256 GB) of the second CXL memory 220_2) may be used as a system memory by the host 201. That is, based on the memory capacity required by the CXL storage 210 and the capacities of the plurality of CXL memories 220_1 to 220_4, the host 201 may allocate a memory area dedicated for the CXL storage 210 such that the first map data MD1 of the CXL storage 210 are evenly stored in the plurality of CXL memories 220_1 to 220_4.

In an example embodiment, the four sub-map data MD1-a, MD1-b, MD1-c, and MD1-d of the first map data MD1 may have different sizes. In an example embodiment, the sizes of the four sub-map data MD1-a, MD1-b, MD1-c, and MD1-d may respectively correspond to the sizes of the memory areas allocated from the plurality of CXL memories 220_1 to 220_4. For example, the size of the first sub-map data MD1-a may correspond to the size of the memory area allocated from the first CXL memory 220_1, the size of the second sub-map data MD1-b may correspond to the size of the memory area allocated from the second CXL memory 220_2, the size of the third sub-map data MD1-c may correspond to the size of the memory area allocated from the third CXL memory 220_3, and the size of the fourth sub-map data MD1-d may correspond to the size of the memory area allocated from the fourth CXL memory 220_4.

In an example embodiment, the host 201 may allocate some of the plurality of CXL memories 220_1 to 220_4 for a memory area dedicated for the CXL storage 210. For example, as illustrated in FIG. 11C, the host 201 may allocate memory areas of the first to third CXL memories 220_1 to 220_3 among the plurality of CXL memories 220_1 to 220_4 for a memory area dedicated for the CXL storage 210. In this case, the first map data MD1 of the CXL storage 210 may be divided into three sub-map data MD1-a, MD1-b, and MD1-c, and the three sub-map data MD1-a, MD1-b, and MD1-c may be respectively stored in the first to third CXL memories 220_1 to 220_3.

For example, it is assumed that the first map data MD1 of the CXL storage 210 is 1 TB and the plurality of CXL memories 220_1 to 220_4 are 512 GB, 256 GB, 256 GB, and 128 GB, respectively. The host 201 may manage memory areas of the plurality of CXL memories 220_1 to 220_4 such that the memory areas of the plurality of CXL memories 220_1 to 220_4 have logical addresses continuous to each other. In this case, the host 201 may allocate the 512 GB memory area of the first CXL memory 220_1, the 256 GB memory area of the second CXL memory 220_2, and the 256 GB memory area of the third CXL memory 220_3 to the CXL storage 210, and may use the 128 GB memory area of the fourth CXL memory 220_4 as a system memory.

In an example embodiment, the host 201 may manage the memory areas of the plurality of CXL memories 220_1 to 220_4 by using one continuous logical address area or one continuous virtual address area. The host 201 may allocate a portion of the one continuous logical address area for a memory area dedicated for the CXL storage 210. In this case, the logical address area or virtual address area allocated for the dedicated memory area may be a continuous area.

In an example embodiment, a plurality of sub-map data may be generated by dividing one map data in various manners. For example, the plurality of sub-map data may be generated by dividing one map data in units of physical address or logical address that is managed by the CXL storage 210. Also, the plurality of sub-map data may be generated by dividing one map data based on various data characteristics.

The embodiments described with reference to FIGS. 11A to 11C are provided only as an example, and a way to allocate memory areas of a plurality of CXL memories for a memory area dedicated for CXL storage may be variously changed.

Figure 12A:
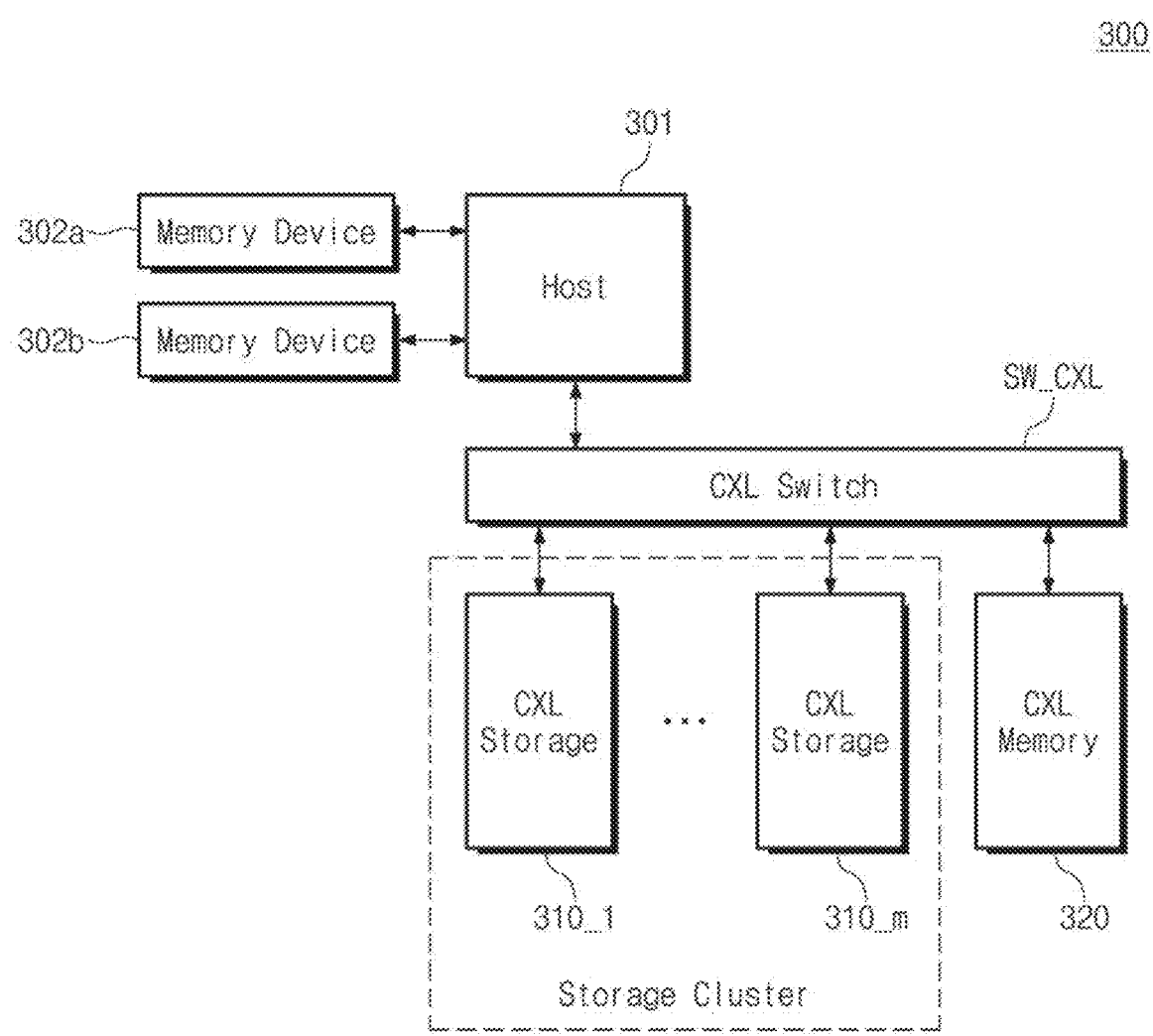
FIG. 12A is a block diagram illustrating a computing system according to an example embodiment.

FIG. 12A is a block diagram illustrating a computing system according to an example embodiment. Below, for convenience of description, additional description associated with the components described above will be omitted to avoid redundancy. Referring to FIG. 12A, a computing system 300 may include a host 301, a plurality of memory devices 302a and 302b, the CXL switch SW_CXL, a plurality of CXL storages 310_1 to 310_m, and a CXL memory 320.

The host 301 may be directly connected with the plurality of memory devices 302a and 302b. The host 301, the plurality of CXL storages 310_1 to 310_m, and the CXL memory 320 may be connected with the CXL switch SW_CXL and may communicate with each other through the CXL switch SW_CXL.

In an example embodiment, each of the plurality of CXL storages 310_1 to 310_m may have a structure similar to that of the CXL storage 110 described with reference to FIGS. 2 to 10. That is, each of the plurality of CXL storages 310_1 to 310_m may be implemented with an individual storage device or storage module and may be connected with the CXL switch SW_CXL through different physical ports. That is, as the plurality of CXL storages 310_1 to 310_m are connected with the CXL switch SW_CXL, a memory area (or capacity) that is available by the host 201 may increase.

In an example embodiment, at least a partial area of the CXL memory 320 may be allocated for an area dedicated for the plurality of CXL storages 310_1 to 310_m. For example, the host 301 may manage the plurality of CXL storages 310_1 to 310_m as one storage cluster and may allocate a partial area of the CXL memory 320 for a dedicated area of one storage cluster. Alternatively, the host 201 may allocate partial areas of the CXL memory 320 for dedicated areas of the respective CXL storages 310_1 to 310_m.

Figure 12B:
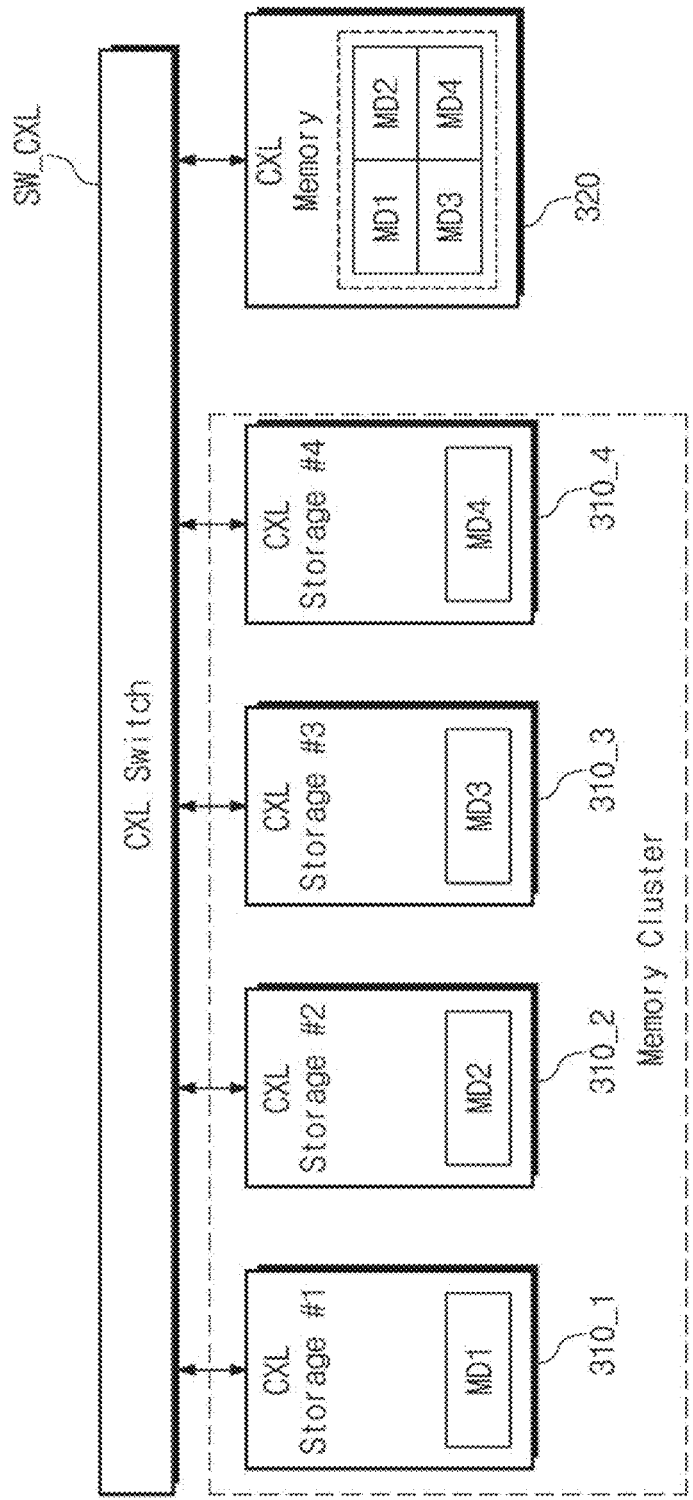
FIGS. 12B and 12C are diagrams of an operation of a computing system of FIG. 12A according to an example embodiment.
Figure 12C:
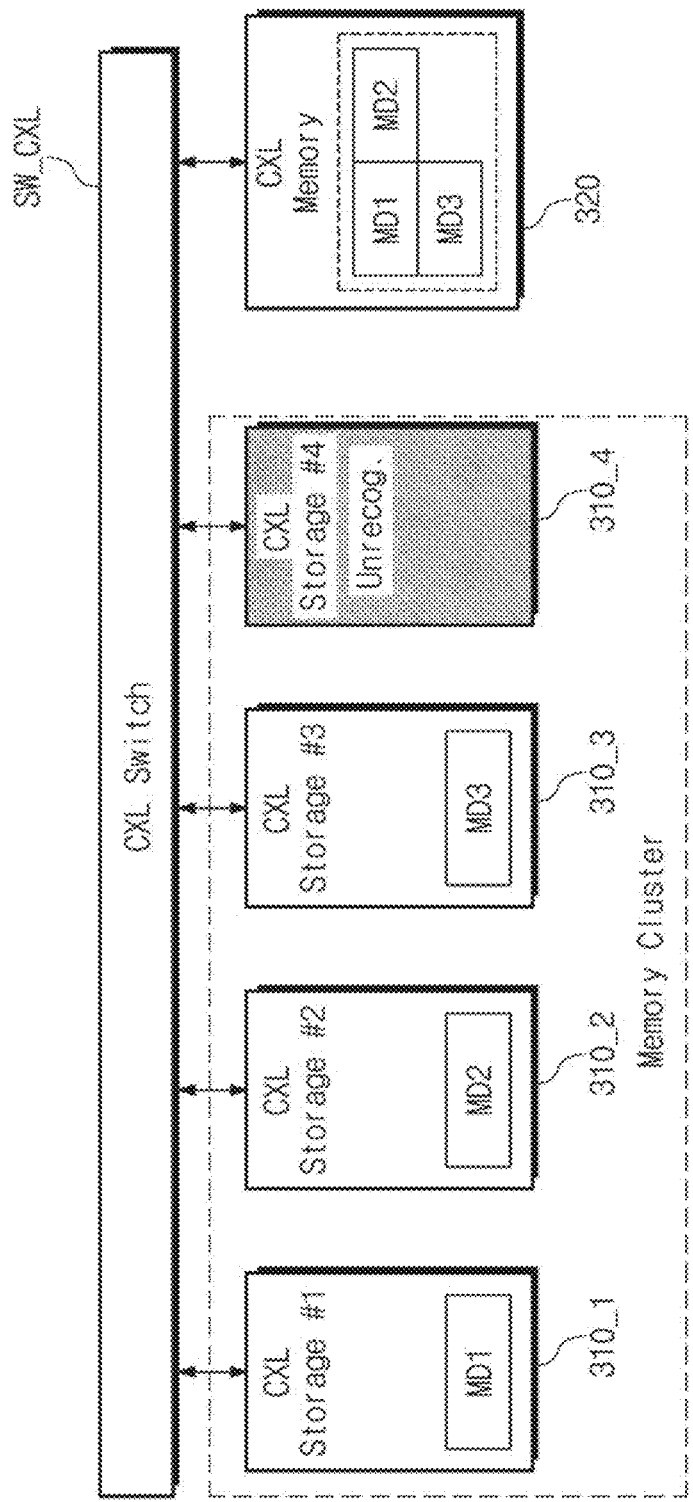

FIGS. 12B and 12C are diagrams of an operation of a computing system of FIG. 12A according to an example embodiment. Referring to FIGS. 4, 12A, 12B, and 12C, the host 201 may allocate a memory area of the of CXL memory 320 for a memory or a memory area dedicated for the plurality of CXL storages 310_1 to 310_4, based on the initialization operation described with reference to FIG. 4.

For example, the first CXL storage 310_1 may manage user data (i.e., data stored in the first CXL storage 310_1) by using the first map data MD1, the second CXL storage 310_2 may manage user data (i.e., data stored in the second CXL storage 310_2) by using the second map data MD2, the third CXL storage 310_3 may manage user data (i.e., data stored in the third CXL storage 310_3) by using the third map data MD3, and the fourth CXL storage 310_4 may manage user data (i.e., data stored in the fourth CXL storage 310_4) by using the fourth map data MD4.

The host 301 may allocate the memory area of the CXL memory 320 for a dedicated memory area where the first to fourth map data MD1 to MD4 are to be stored. The first to fourth CXL storages 310_1 to 310_4 may store the first to fourth map data MD1 to MD4 in the dedicated memory area allocated from the CXL memory 320. The first to fourth CXL storages 310_1 to 310_4 and the CXL memory 320 may exchange the first to fourth map data MD1 to MD4 based on the methods described with reference to FIGS. 1 to 10.

In an example embodiment, the host 301 may allocate the memory area dedicated for the plurality of CXL storages 310_1 to 310_4 from the CXL memory 320, based on the priority of each of the plurality of CXL storages 310_1 to 310_4.

For example, the host 301 may assign the priority to each of the plurality of CXL storages 310_1 to 310_4, based on the storage capacity of each of the plurality of CXL storages 310_1 to 310_4. In an example embodiment, it is assumed that the first to fourth CXL storages 310_1 to 310_4 are 512 TB, 256 TB, 256 TB, and 125 TB. In this case, the host 301 may allocate a dedicated memory area of the CXL memory 320 to the first CXL storage 310_1, which has the largest capacity, from among the first to fourth CXL storages 310_1 to 310_4. The host 301 may allocate a dedicated memory area of the CXL memory 320 to the second and third CXL storages 310_2 and 320_3, which has the second largest capacity, from among the first to fourth CXL storages 310_1 to 310_4. In an example embodiment, when there are a plurality of storage devices having the same storage capacity, the priorities of the CXL storages may be determined based on device identifiers or any other information of the CXL storages. The host 301 may allocate a dedicated memory area of the CXL memory 320 to the fourth CXL storage 310_4, which has the smallest capacity, from among the first to fourth CXL storages 310_1 to 310_4. The first to fourth CXL storages 310_1 to 310_4 may store the first to fourth map data MD1 to MD4 in the dedicated memory areas thus allocated.

In an example embodiment, when the total size of the first to fourth map data MD1 to MD4 of the plurality of CXL storages 310_1 to 310_4 is smaller than the memory capacity of the CXL memory 320, the first to fourth map data MD1 to MD4 may be normally stored in the CXL memory 320. In contrast, when the total size of the first to fourth map data MD1 to MD4 of the plurality of CXL storages 310_1 to 310_4 is larger than the memory capacity of the CXL memory 320, at least some of the first to fourth map data MD1 to MD4 may not be stored in the CXL memory 320. In this case, as described above, the dedicated memory area may be allocated from the CXL memory 320 depending on the priority of CXL storage, and CXL storage to which the dedicated memory area is not allocated may not be recognized by the host 301 as storage.

As illustrated in FIG. 12C, the host 301 may allocate memory areas dedicated for the first to third CXL storages 310_1 to 310_3 from the CXL memory 320. The first to third CXL storages 310_1 to 310_3 may store the first to third map data MD1 to MD3 in the CXL memory 320.

In an example embodiment, a dedicated memory area may not be allocated to the fourth CXL storage 310_4 due to an insufficient memory capacity of the CXL memory 320. In this case, the fourth CXL storage 310_4 may not be recognized by the host 301 as storage or may not operate.

Figure 13A:
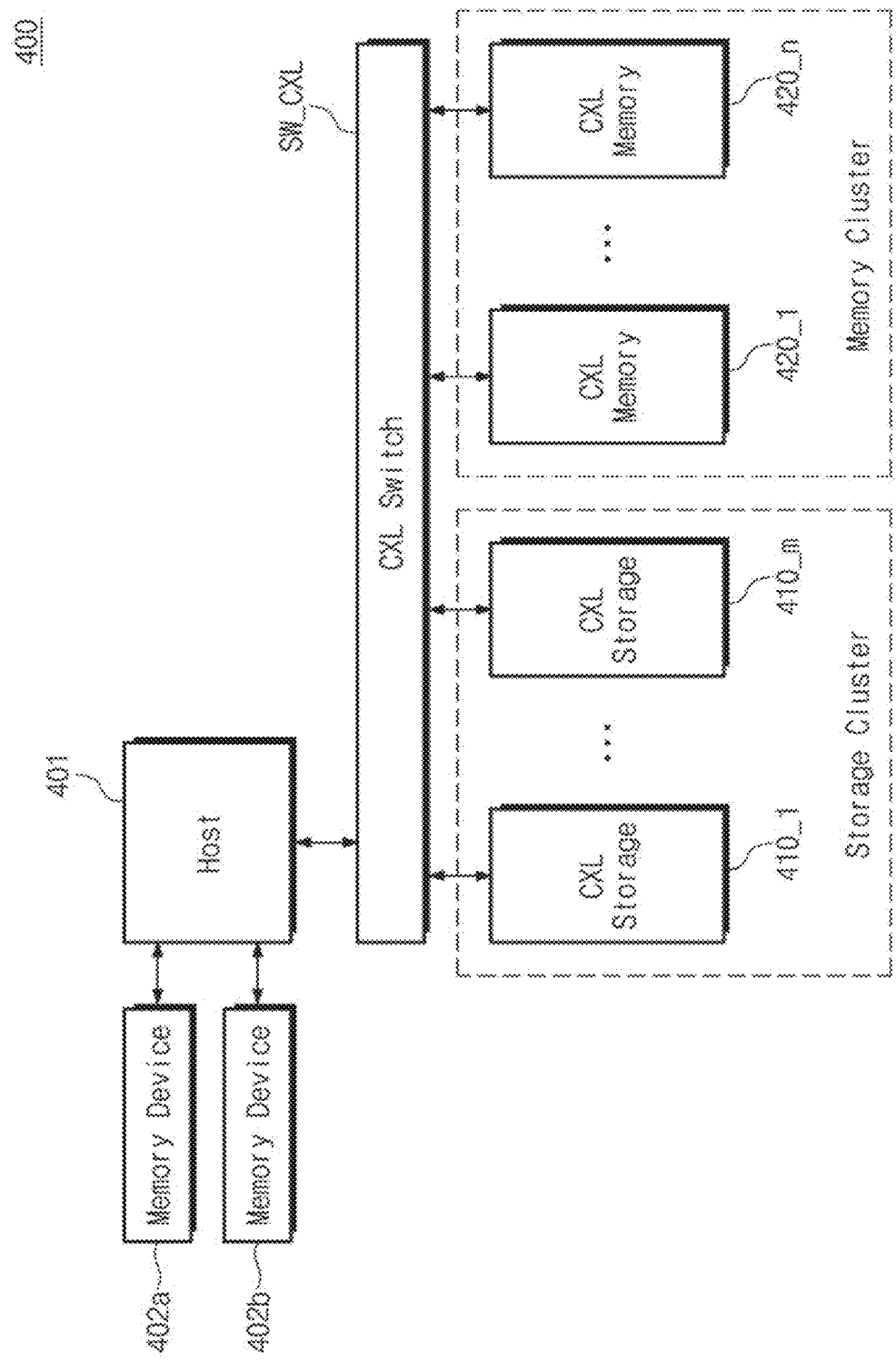
FIG. 13A is a block diagram illustrating a computing system according to an example embodiment.

FIG. 13A is a block diagram illustrating a computing system according to an example embodiment. Below, for convenience of description, additional description associated with the components described above will be omitted to avoid redundancy. Referring to FIG. 13A, a computing system 400 may include a host 401, a plurality of memory devices 402a and 402b, the CXL switch SW_CXL, a plurality of CXL storages 410_1 to 410_m, and a plurality of CXL memories 420_1 to 420_n.

The host 401 may be directly connected with the plurality of memory devices 402a and 402b. The host 401, the plurality of CXL storages 410_1 to 410_m, and the plurality of CXL memories 420_1 to 420_n may be connected with the CXL switch SW_CXL and may communicate with each other through the CXL switch SW_CXL.

In an example embodiment, the host 401 may manage the plurality of CXL storages 410_1 to 410_m as one storage cluster, and may mange the plurality of CXL memories 420_1 to 420_n as one memory cluster. The host 401 may allocate a partial area of the memory cluster for a dedicated area (i.e., an area for storing map data of the storage cluster) of the storage cluster. Alternatively, the host 201 may allocate areas of the CXL memories 420_1 to 420_n for dedicated areas of the respective CXL storages 410_1 to 410_m.

Figure 13B:
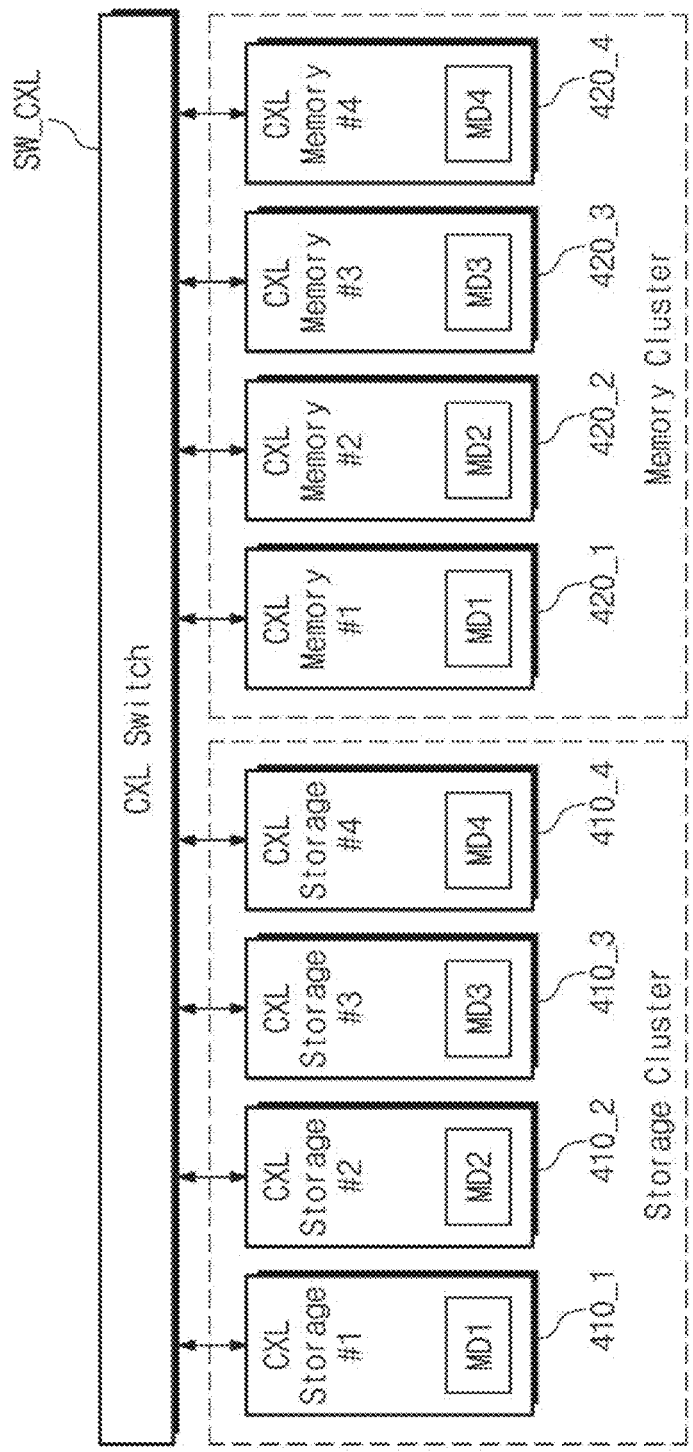
FIGS. 13B, 13C and 13D are diagrams of an operation of a computing system of FIG. 13A according to an example embodiment.
Figure 13C:
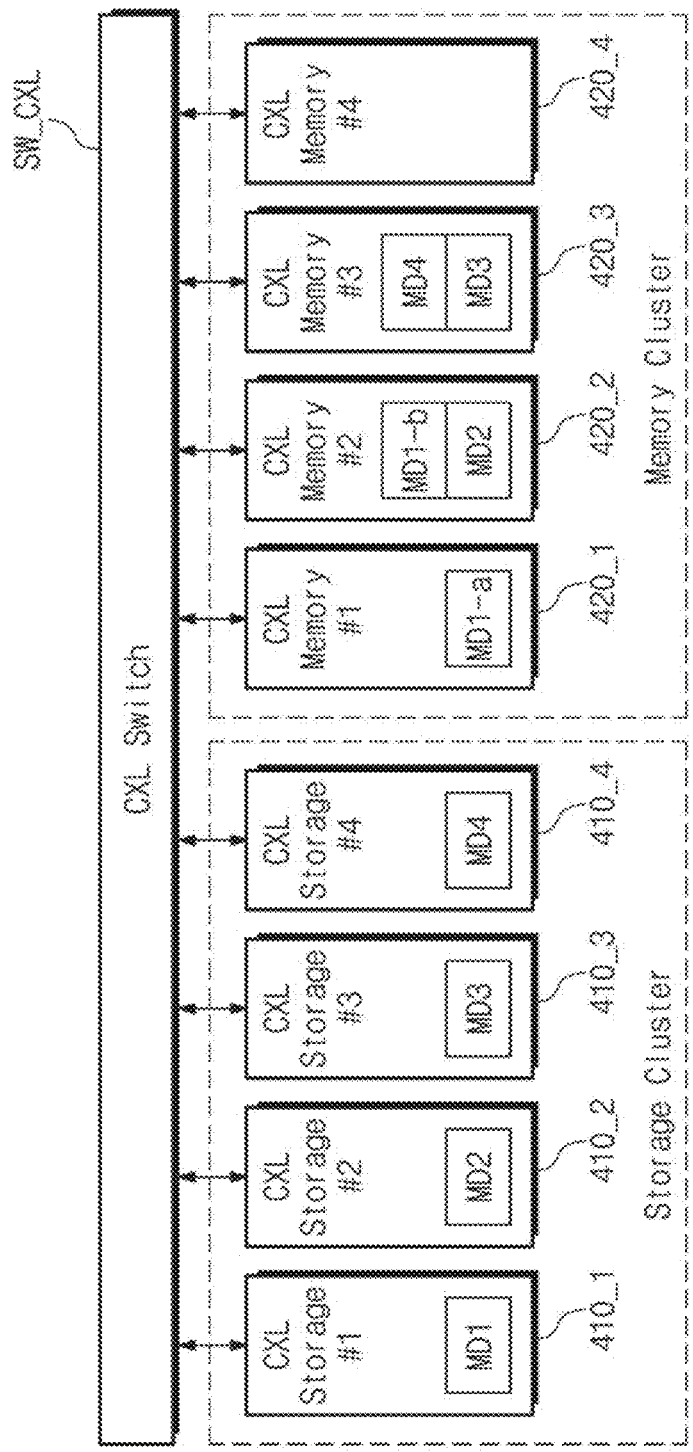
Figure 13D:
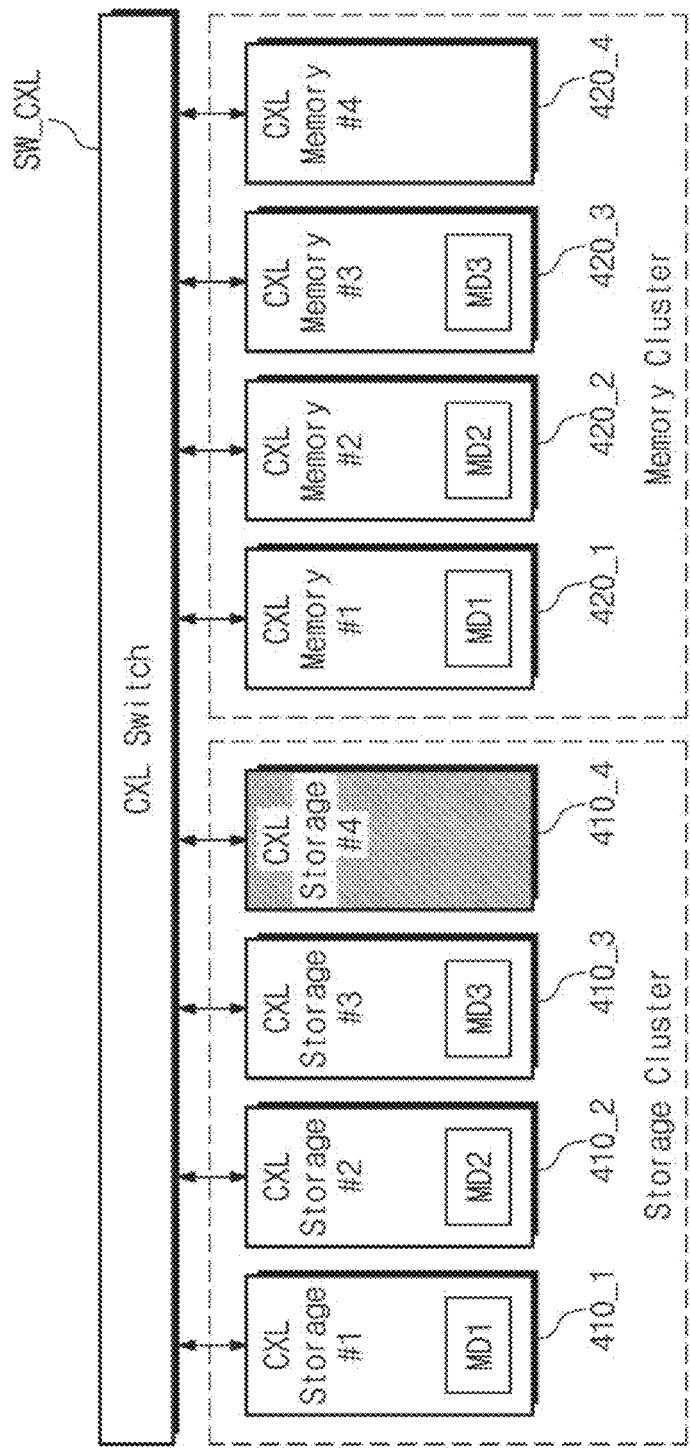

FIGS. 13B, 13C and 13D are diagrams of an operation of a computing system of FIG. 13A according to an example embodiment. Referring to FIGS. 4, 13A, 13B, 13C, and 13D, the host 401 may allocate at least some of memory areas of the plurality of CXL memories 420_1 to 420_4 for a memory or a memory area dedicated for the plurality of CXL storages 410_1 to 410_4 (or a storage cluster), based on the initialization operation described with reference to FIG. 4.

For example, the first CXL storage 410_1 may manage user data (i.e., data stored in the first CXL storage 410_1) by using the first map data MD1, the second CXL storage 410_2 may manage user data (i.e., data stored in the second CXL storage 410_2) by using the second map data MD2, the third CXL storage 410_3 may manage user data (i.e., data stored in the third CXL storage 410_3) by using the third map data MD3, and the fourth CXL storage 410_4 may manage user data (i.e., data stored in the fourth CXL storage 410_4) by using the fourth map data MD4.

The host 301 may allocate a dedicated memory area, in which the first to fourth map data MD1 to MD4 are to be stored, from among memory areas of the plurality of CXL memories 420_1 to 420_4. The first to fourth CXL storages 410_1 to 410_4 may store the first to fourth map data MD1 to MD4 in the dedicated memory area allocated from the plurality of CXL memories 420_1 to 420_4. The first to fourth CXL storages 410_1 to 410_4 and the plurality of CXL memories 420_1 to 420_4 may exchange the first to fourth map data MD1 to MD4 based on the methods described with reference to FIGS. 1 to 10.

In an example embodiment, the host 301 may allocate a dedicated memory area, in which the first to fourth map data MD1 to MD4 are to be stored, from among memory areas of the plurality of CXL memories 420_1 to 420_4 through various manners. For example, the host 401 may allocate at least a partial area of the first CXL memory 420_1 for a dedicated memory area of the first CXL storage 410_1, may allocate at least a partial area of the second CXL memory 420_2 for a dedicated memory area of the second CXL storage 410_2, may allocate at least a partial area of the third CXL memory 420_3 for a dedicated memory area of the third CXL storage 410_3, and may allocate at least a partial area of the fourth CXL memory 420_4 for a dedicated memory area of the fourth CXL storage 410_4. In this case, the first CXL storage 410_1 may store the first map data MD1 in the first CXL memory 420_1, the second CXL storage 410_2 may store the second map data MD2 in the second CXL memory 420_2, the third CXL storage 410_3 may store the third map data MD3 in the third CXL memory 420_3, and the fourth CXL storage 410_4 may store the fourth map data MD4 in the fourth CXL memory 420_4.

That is, when the number of CXL memories is more than or equal to the number of CXL storages and a memory capacity of each CXL memory is sufficient to store map data of each CXL storage, memory areas dedicated for the plurality of CXL storages may be allocated from the plurality of CXL memories such that the plurality of CXL storages and the plurality of CXL memories correspond to each other one-to-one.

Alternatively, as illustrated in FIG. 13C, the host 401 may manage memory areas of the plurality of CXL memories 420_1 to 420_4 by using one logical address area and may allocate a dedicated memory area to the plurality of CXL storages 410_1 to 410_4. In this case, the dedicated memory area may include a continuous logical address area. For example, the first to fourth map data MD1 to MD4 of the first to fourth CXL storages 410_1 to 410_4 may be sequentially stored in the first to fourth CXL memories 420_1 to 420_4. For example, the first map data MD1 may be divided into two sub-map data MD1-a and MD1-b. In this case, one MD1-a of the two sub-map data MD1-a and MD1-b may be stored in the first CXL memory 420_1, and the other MD1-b thereof may be stored in the second CXL memory 420_2. In an example embodiment, the size of the sub-map data MD1-a may correspond to the memory capacity of the first CXL memory 420_1. The second map data MD2 may be stored in the remaining memory area of the second CXL memory 420_2. The third and fourth map data MD3 and MD4 may be stored in the third CXL memory 420_3. The fourth CXL memory 420_4 may not be allocated for a dedicated memory area. In this case, the host 401 may use the fourth CXL memory 420_4 as a system memory.

In an example embodiment, a dedicated memory area may not be allocated to specific CXL storage (e.g., 410_4). For example, as described above, the size of map data of specific CXL storage may be larger than the memory capacity of each CXL memory. In this case, a memory area dedicated for the specific CXL storage may not be allocated. For example, as illustrated in FIG. 13D, memory areas dedicated for the first to third CXL storages 410_1 to 410_3 may be allocated from the first to third CXL memories 420_1 to 420_3. In contrast, when the memory capacity of the fourth CXL memory 410_4 is smaller than the size of the fourth map data MD4 of the fourth CXL storage 410_4, a dedicated memory area may not be allocated from the fourth CXL memory 420_4, and the fourth CXL storage 410_4 may not be recognized by the host 401 as storage.

Examples of the dedicated memory area allocation structure and method are provided with regard to the above topologies, and the present disclosure is not limited thereto.

Figure 14:
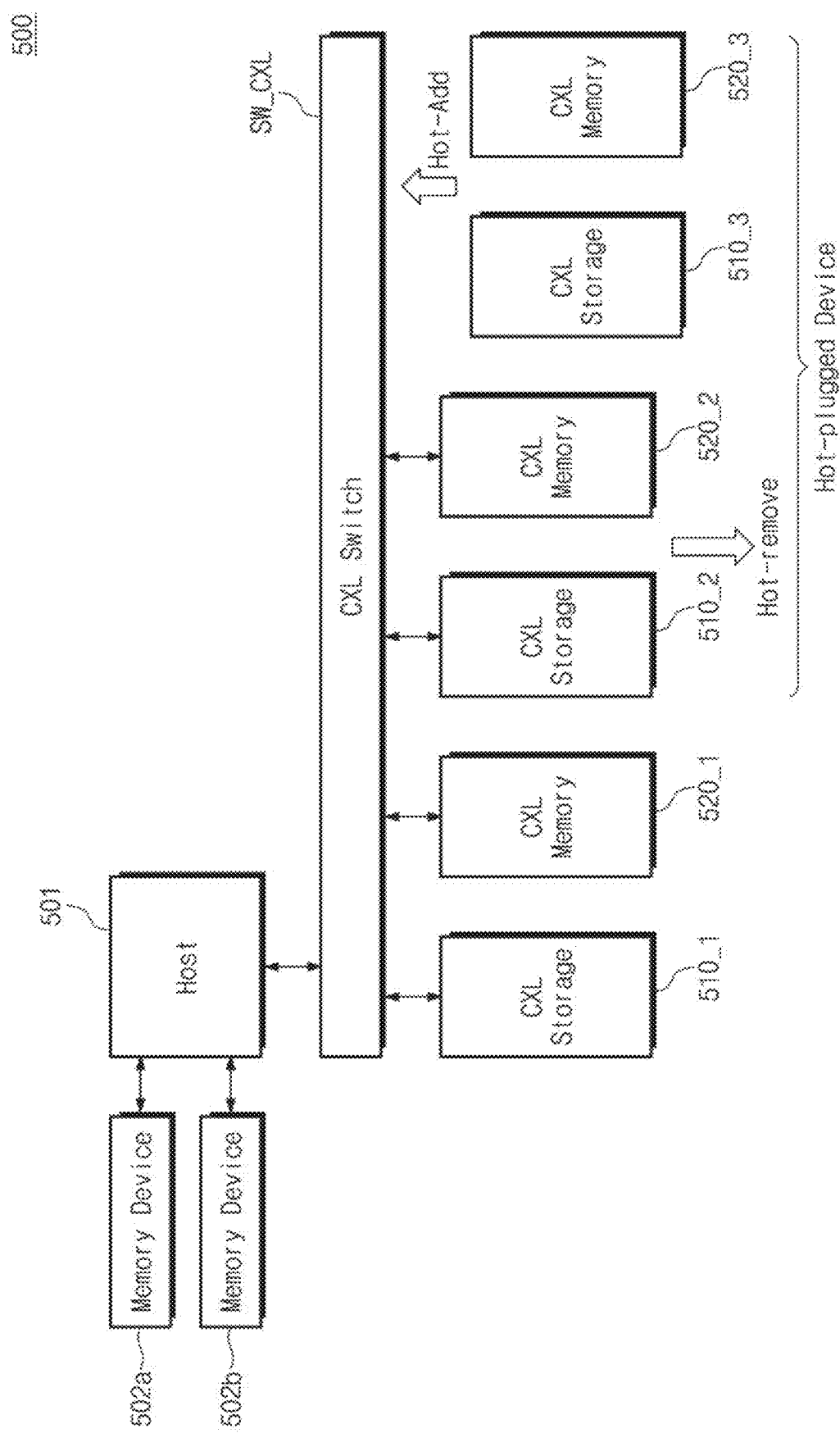
FIG. 14 is a block diagram illustrating a computing system according to an example embodiment.

FIG. 14 is a block diagram illustrating a computing system according to an example embodiment. Below, for convenience of description, additional description associated with the components described above will be omitted to avoid redundancy. Referring to FIG. 14, a computing system 500 may include a host 501, a plurality of memory devices 502a and 502b, the CXL switch SW_CXL, a plurality of CXL storages 510_1, 510_2, and 510_3, and a plurality of CXL memories 520_1, 520_2, and 502_3.

The host 501 may be directly connected with the plurality of memory devices 502a and 502b. The host 501, the plurality of CXL storages 510_1 and 510_2, and the plurality of CXL memories 520_1 and 520_2 may be connected with the CXL switch SW_CXL and may communicate with each other through the CXL switch SW_CXL. As in the above description, a partial area of the CXL memories 520_1 and 520_2 may be allocated for a dedicated area of the CXL storages 510_1 and 510_2.

In an example embodiment, while the computing system 500 is being driven, some of the CXL storages 510_1 and 510_2 or some of the CXL memories 520_1 and 520_2 may be hot-removed from the CXL switch SW_CXL. Alternatively, while the computing system 500 is being driven, the CXL storage 510_3 or the CXL memory 520_3 may be hot-added to the CXL switch SW_CXL. In this case, the host 501 may again perform memory allocation by again performing the initialization operation on devices connected with the CXL switch SW_CXL through the reset operation or the hot-plug operation. That is, CXL storage and a CXL memory according to an example embodiment of the present disclosure may support the hot-plug function and may make it possible to expand a storage capacity and a memory capacity of a computing system through various connections.

Figure 15:
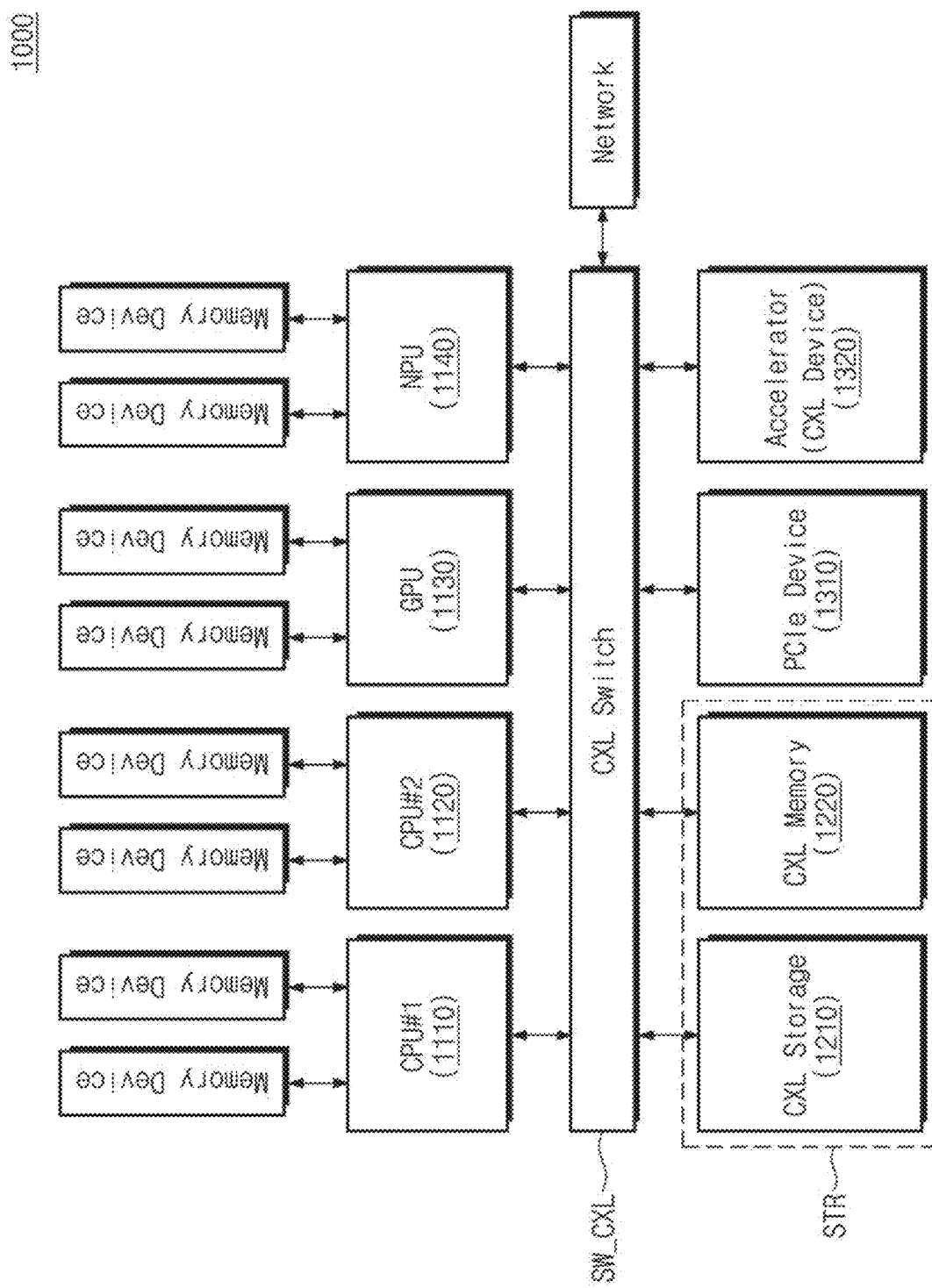
FIG. 15 is a block diagram illustrating a computing system according to an example embodiment.

FIG. 15 is a block diagram illustrating a computing system according to an example embodiment. For convenience of description, additional description associated with the components described above will be omitted to avoid redundancy. Referring to FIG. 15, a computing system 1000 may include a first CPU 1110, a second CPU 1120, a GPU 1130, an NPU 1140, the CXL switch SW_CXL, CXL storage 1210, a CXL memory 1220, a PCIe device 1310, and an accelerator (CXL device) 1320.

The first CPU 1110, the second CPU 1120, the GPU 1130, the NPU 1140, the CXL storage 1210, the CXL memory 1220, the PCIe device 1310, and the accelerator (CXL device) 1320 may be connected in common with the CXL switch SW_CXL and may communicate with each other through the CXL switch SW_CXL.

In an example embodiment, each of the first CPU 1110, the second CPU 1120, the GPU 1130, and the NPU 1140 may be the host described with reference to FIGS. 1 to 14 and may be directly connected with individual memory devices.

In an example embodiment, the CXL storage 1210 and the CXL memory 1220 may be the CXL storage and the CXL memory described with reference to FIGS. 2 to 14, and at least a partial area of the CXL memory 1220 may be allocated for an area dedicated for the CXL storage 1210 by one or more of the first CPU 1110, the second CPU 1120, the GPU 1130, and the NPU 1140. That is, the CXL storage 1210 and the CXL memory 1220 may be used a storage space STR of the computing system 1000.

In an example embodiment, the CXL switch SW_CXL may be connected with the PCIe device 1310 or the accelerator 1320 configured to support various functions, and the PCIe device 1310 or the accelerator 1320 may communicate with each of the first CPU 1110, the second CPU 1120, the GPU 1130, and the NPU 1140 through the CXL switch SW_CXL or may access the storage space STR including the CXL storage 1210 and the CXL memory 1220 through the CXL switch SW_CXL.

In an example embodiment, the CXL switch SW_CXL may be connected with an external network or Fabric and may be configured to communicate with an external server through the external network or Fabric.

Figure 16:
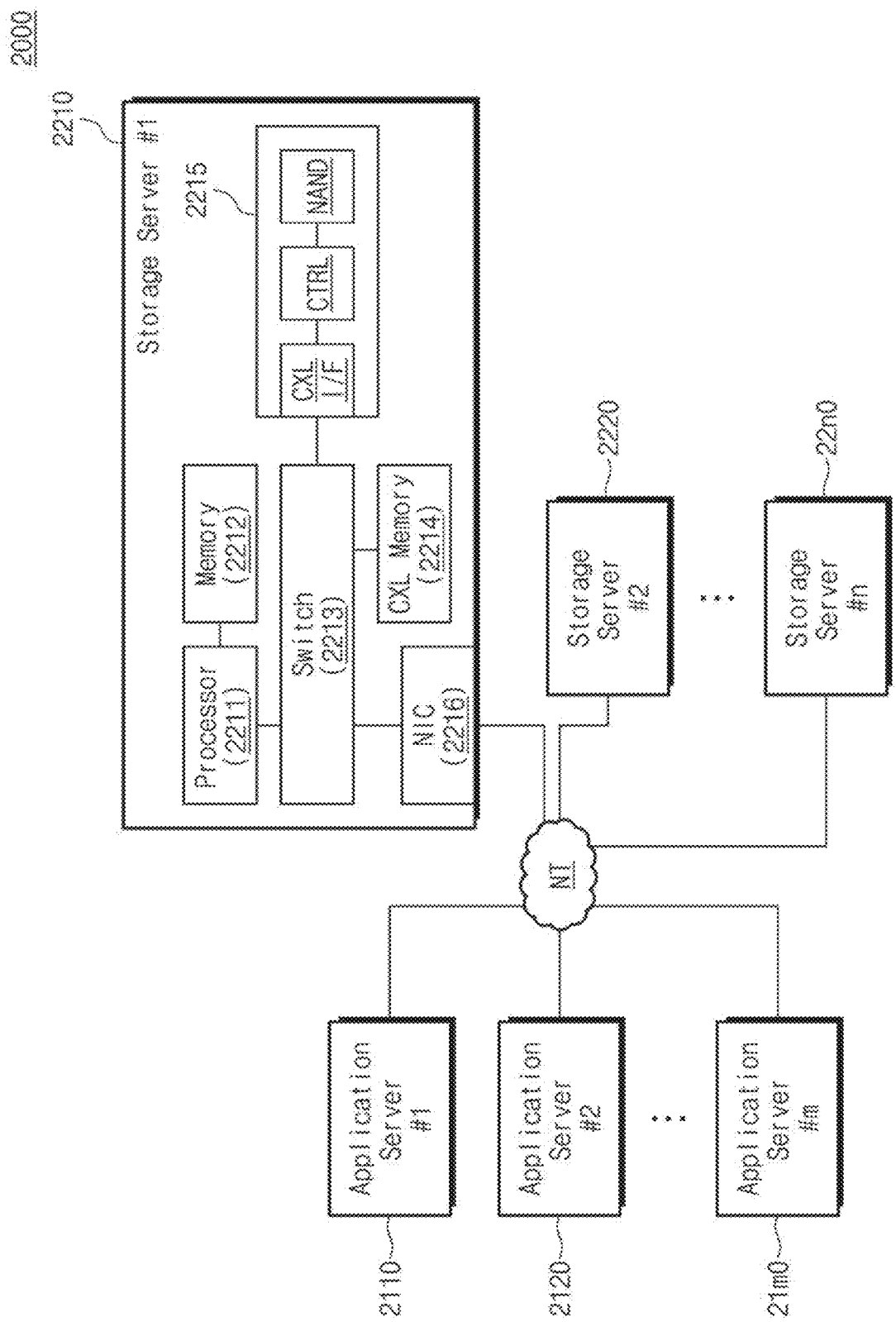
FIG. 16 is a block diagram illustrating a data center to which a computing system is applied according to an example embodiment.

FIG. 16 is a block diagram illustrating a data center to which a computing system is applied according to an example embodiment. Referring to FIG. 16, a data center 2000 that is a facility collecting various data and providing services may be referred to as a "data storage center". The data center 2000 may be a system for operating a search engine and a database, and may be a computing system used in a business such as a bank or in a government institution. The data center 2000 may include application servers 2110 to 21*m*0 and storage servers 2210 to 22*n*0. The number of application servers and the number of storage servers may be variously selected depending on an example embodiment, and the number of application servers and the number of storage servers may be different from each other.

Below, a configuration of the first storage server 2210 will be mainly described. The application servers 2110 to 21*m*0 may have similar structures, the storage servers 2210 to 22*n*0 may have similar structures, and the application servers 2110 to 21*m*0 and the storage servers 2210 to 22*n*0 may communicate with each other over a network NT.

The first storage server 2210 may include a processor 2211, a memory 2212, a switch 2213, a storage device 2215, a CXL memory 2214, and a network interface card (NIC) 2216. The processor 2211 may control an overall operation of the first storage server 2210 and may access the memory 2212 to execute an instruction loaded onto the memory 2212 or to process data. The memory 2212 may be implemented with a DDR synchronous DRAM (SDRAM), a high bandwidth memory (HBM), a hybrid memory cube (HMC), a dual in-line memory module (DIMM), an Optane DIMM, and/or a non-volatile DIMM (NVMDIMM). The processor 2211 and the memory 2212 may be directly connected, and the numbers of processors 2211 and memories 2212 included in one storage server 2210 may be variously selected.

In an example embodiment, the processor 2211 and the memory 2212 may provide a processor-memory pair. In an example embodiment, the number of processors 2211 and the number of memories 2212 may be different from each other. The processor 2211 may include a single core processor or a multi-core processor. The detailed description of the storage server 2210 may be similarly applied to the application servers 2110 to 21*m*0.

The switch 2213 may be configured to arbitrate or route the communications between various components included in the first storage server 2210. In an example embodiment, the switch 2213 may be implemented with the CXL switch SW_CXL described with reference to FIGS. 1 to 15. That is, the switch 2213 may be a switch implemented based on the CXL protocol.

The CXL memory 2214 may be connected with the switch 2213. In an example embodiment, the CXL memory 2214 may be used as a memory expander for the processor 2211. Alternatively, as described with reference to FIGS. 1 to 15, the CXL memory 2214 may be allocated for a dedicated memory or a buffer memory of the storage device 2215.

The storage device 2215 may include a CXL interface circuit CXL_IF, a controller CTRL, and a NAND flash NAND. Depending on a request of the processor 2211, the storage device 2215 may store data or may output the stored data. In an example embodiment, the storage device 2215 may be implemented with the CXL storage described with reference to FIGS. 1 to 15. In an example embodiment, as in the description given with reference to FIGS. 1 to 15, at least a partial area of the CXL memory 2214 may be allocated for a dedicated area, and the dedicated area may be used as a buffer memory (i.e., may be used to store map data in the CXL memory 2214).

According to an example embodiment, the application servers 2110 to 21*m*0 may not include the storage device 2215. The storage server 2210 may include at least one or more storage devices 2215. The number of storage devices 2215 included in the storage server 2210 may be variously selected depending on an example embodiment.

The NIC 2216 may be connected with the CXL switch SW_CXL. The NIC 2216 may communicate with the remaining storage servers 2220 to 22*n*0 or the application servers 2110 to 21*m*0 over the network NT.

In an example embodiment, the NIC 2216 may include a network interface card, a network adapter, etc. The NIC 2216 may be connected with the network NT by a wired interface, a wireless interface, a Bluetooth interface, an optical interface, etc. The NIC 2216 may include an internal memory, a digital signal processor (DSP), a host bus interface, etc., and may be connected with the processor 2211 and/or the switch 2213 through the host bus interface. In an example embodiment, the NIC 2216 may be integrated with at least one of the processor 2211, the switch 2213, and the storage device 2215.

In an example embodiment, the network NT may be implemented by using a Fiber channel (FC) or an Ethernet. In this case, the FC may be a medium that is used in high-speed data transmission and may use an optical switch that provides high performance/high availability. Storage servers may be provided as file storage, block storage, or object storage depending on an access manner of the network NT.

In an example embodiment, the network NT may be a storage-dedicated network such as a storage area network (SAN). For example, the SAN may be a FC-SAN that uses a FC network and is implemented depending on a FC protocol (FCP). For another example, the SAN may be an internet protocol (IP)-SAN that uses a transmission control protocol (TCP)/IP network and is implemented depending on an internet small computer system interface (iSCSI) (SCSI over TCP/IP or Internet SCSI). In an example embodiment, the network NT may be a legacy network such as a TCP/IP network. For example, the network NT may be implemented depending on the following protocol: FC over Ethernet (FCoE), network attached storage (NAS), or NVMe over Fabrics (NVMe-oF).

In an example embodiment, at least one of the application servers 2110 to 21*m*0 may store data, which are store-requested by a user or a client, in one of the storage servers 2210 to 22*n*0 over the network NT. At least one of the application servers 2110 to 21*m*0 may obtain data, which are read-requested by the user or the client, from one of the storage servers 2210 to 22*n*0 over the network NT. For example, at least one of the application servers 2110 to 21*m*0 may be implemented with a web server, a database management system (DBMS), etc.

In an example embodiment, at least one of the application servers 2110 to 21*m*0 may access a memory, a CXL memory, or a storage device included in any other application server over the network NT or may access memories, CXL memories, or storage devices included in the storage servers 2210 to 22*n*0 over the network NT. As such, at least one of the application servers 2110 to 21*m*0 may perform various operations on data stored in the remaining application servers and/or storage servers. For example, at least one of the application servers 2110 to 21*m*0 may execute an instruction for moving or copying data between the remaining application servers and/or storage servers. In this case, the data may be moved from storage devices of storage servers to memories or CXL memories of application servers through memories or CXL memories of the storage servers or directly. The data that are transferred over a network may be data that are encrypted for security or privacy.

In an example embodiment, a CXL memory included in at least one of the application servers 2110 to 21*m*0 and the storage servers 2210 to 22*n*0 may be allocated for a dedicated area of a storage device included in at least one of the application servers 2110 to 21*m*0 and the storage servers 2210 to 22n0, and the storage device may use the dedicated area thus allocated as a buffer memory (i.e., may store map data in the dedicated area). For example, a CXL memory included in a storage server (e.g., 22n0) may be allocated to the storage device 2215 included in the storage server 2210, and the storage device 2215 included in the storage server 2210 may access the CXL memory included in the storage server (e.g., 22n0) over the switch 2213 and the NIC 2216. In this case, the map data associated with the storage device 2215 of the first storage server 2210 may be stored in the CXL memory of the storage server 22n0. That is, storage devices and CXL memories of a data center according to the present disclosure may be connected and implemented in various manners.

According to the present disclosure, map data of a storage device may be stored in a memory device separated from the storage device. Accordingly, a large amount of map data may be used without costs for separate research and development. Accordingly, an operation method of a host configured to communicate with storage devices and memory devices, with performance improved and costs reduced, and a system including the storage devices and the memory devices are provided.

At least one of the components, elements, modules or units (collectively "components" in this paragraph) represented by a block in the drawings may be embodied as various numbers of hardware, software and/or firmware structures that execute respective functions described above. At least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

Although the disclosure been described in connection with some embodiments illustrated in the accompanying drawings, it will be understood by one of ordinary skill in the art that variations in form and detail may be made therein without departing from the spirit and essential feature of the disclosure. The above disclosed embodiments should thus be considered illustrative and not restrictive.

What is claimed is:

1. A system comprising:
    a first compute express link (CXL) storage device;
    a second CXL storage device:
    a first CXL memory device; and
    a CXL switch connected to the first CXL storage device, the second CXL storage device and the first CXL memory device through a CXL interface, the CXL switch configured to arbitrate communications between the first CXL storage device and the second CXL storage device, and the first CXL memory device,
    wherein the first CXL memory device is configured to store first map data of the first CXL storage device and second map data of the second CXL storage device,
    wherein the first CXL storage device is configured to exchange at least a portion of the first map data with the first CXL memory device through the CXL switch,
    wherein the second CXL storage device is configured to exchange at least a portion of the second map data with the first CXL memory device through the CXL switch, and
    wherein the first CXL memory device comprises a first dedicated area allocated for the first map data and accessible by the first CXL storage device, a second dedicated area allocated for the second map data and accessible by the second CXL storage device, and a remaining area that is managed and accessible by an external host.

2. The system of claim 1, wherein the first CXL storage device and the second CXL storage device are configured to exchange data with the external host through the CXL switch.

3. The system of claim 2, wherein the remaining memory area of the first CXL memory device is configured to be accessed by the external host through the CXL switch.

4. The system of claim 3, wherein the first CXL storage device, the second CXL storage device and the external host communicate based on a CXL.io protocol being a peripheral component interconnect express (PCIe)-based non-coherency input/output protocol,
    wherein the first CXL memory device and the external host communicate based on a CXL.mem protocol being a memory access protocol supporting memory access, and
    wherein the first CXL storage device and the second CXL storage device communicates with the first CXL memory device based on the CXL.mem protocol.

5. The system of claim 1, further comprising:
    a third CXL storage device configured to support a hot-plug function installed in or removed from the CXL switch.

6. The system of claim 5, wherein, when the third CXL storage device is installed in the CXL switch, third map data of the third CXL storage device are stored in a residual region of the first CXL memory device in which the first map data and the second map data are not stored.

7. The system of claim 5, wherein, when the third CXL storage device is installed in the CXL switch and a residual region of the first CXL memory device, in which the first map data and the second map data are not stored, is smaller in size than third map data of the third CXL storage device, the third CXL storage device is not identified by the external host as a storage device.

8. A system comprising:
    a first compute express link (CXL) storage device configured to store first map data;
    a first CXL memory device;
    a second CXL memory device; and
    a CXL switch connected to the first CXL storage device, the first CXL memory device and the second CXL memory device through a CXL interface, the CXL switch configured to arbitrate communications between the first CXL storage device, and the first CXL memory device and the second CXL memory device,
    wherein the first CXL storage device is configured to exchange at least a portion of the first map data with the at least one of the first CXL memory device and the second CXL memory device, wherein the first map data comprises first sub-map data and second sub-map data, and wherein the first sub-map data are stored in the first CXL memory device and the second sub-map data are stored in the second CXL memory device.

9. The system of claim 8, wherein the first CXL storage device is configured to exchange data with an external host through the CXL switch.

10. The system of claim 9, wherein a memory area, in which the first map data are not stored, is configured to be accessed by the external host through the CXL switch.

11. A method of a host configured to communicate with a plurality of compute express link (CXL) storage devices and a plurality of CXL memory devices, the method comprising:

identifying storage information of each of the plurality of CXL storage devices;

identifying memory information of each of the plurality of CXL memory devices; and allocating, based on the storage information, a dedicated memory area for each of the plurality of CXL storage devices from at least one of the plurality of CXL memory devices, wherein the plurality of CXL storage devices, the plurality of CXL memory devices, and the host communicate through a CXL interface, wherein map data of each of the plurality of CXL storage devices are stored in respective allocated dedicated memory areas, and wherein, based on a dedicated memory area not being allocated for at least one CXL storage device among the plurality of CXL storage devices, the at least one CXL storage device is not recognized by the host as a CXL storage device.

12. The method of claim 11, wherein dedicated memory areas for each of the plurality of CXL storage devices are allocated such that a first CXL memory device of the plurality of CXL memory devices is configured to store:

first map data of a first CXL storage device of the plurality of CXL storage devices, and second map data of a second CXL storage device of the plurality of CXL storage devices.

13. The method of claim 11, wherein dedicated memory areas are allocated for each of the plurality of CXL storage devices such that first sub-map data of third map data associated with a third CXL storage device of the plurality of CXL storage devices are stored in a second CXL memory device of the plurality of CXL memory devices and second sub-map data of the third map data are stored in a third CXL memory device of the plurality of CXL memory devices.

14. The method of claim 11, wherein the host is configured to use a memory area not allocated as a dedicated memory area as a system memory.

15. The method of claim 14, wherein the host is configured to access the memory area through the CXL interface, based on a CXL.mem protocol being a memory access protocol.

16. The method of claim 11, further comprising:

after the map data of each of the plurality of CXL storage devices are stored in the allocated dedicated memory area:

sending an access request for at least one of the plurality of CXL storage devices through the CXL interface; and receiving a response to the access request from the at least one of the plurality of CXL storage devices through the CXL interface.

17. The method of claim 16, wherein the access request is transferred through the CXL interface, based on a CXL.io protocol being a peripheral component interconnect express (PCIe)-based non-coherency input/output protocol.

18. The method of claim 11, wherein the host is configured to sequentially allocate dedicated memory areas from the plurality of CXL memory devices, based on a storage capacity of each of the plurality of CXL storage devices.

* * * * *